United States Patent
Raghavan et al.

(10) Patent No.: US 12,439,341 B2
(45) Date of Patent: Oct. 7, 2025

(54) METHODS FOR USE OF MINIMUM EFFECTIVE ISOTROPIC RADIATED POWER CONSTRAINTS WITH LOW-PRECISION PHASE SHIFTERS AND/OR AMPLITUDE CONTROL

(71) Applicant: QUALCOMM Incorporated, San Diego, CA (US)

(72) Inventors: Vasanthan Raghavan, West Windsor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/161,708

(22) Filed: Jan. 30, 2023

(65) Prior Publication Data
US 2024/0259948 A1    Aug. 1, 2024

(51) Int. Cl.
| | |
|---|---|
| H04W 52/02 | (2009.01) |
| H04B 7/0426 | (2017.01) |
| H04W 52/38 | (2009.01) |
| H04W 72/1268 | (2023.01) |
| H04W 72/40 | (2023.01) |

(52) U.S. Cl.
CPC ........ *H04W 52/0277* (2013.01); *H04B 7/043* (2013.01); *H04W 52/386* (2013.01); *H04W 72/1268* (2013.01); *H04W 72/40* (2023.01)

(58) Field of Classification Search
CPC ............. H04W 52/0277; H04W 72/40; H04W 52/386; H04W 72/1268; H04W 16/14; H04W 16/28; H04W 24/08; H04W 52/367; H04W 74/0808; H04B 7/043; H04B 7/0697; H04B 7/06952
See application file for complete search history.

(56) References Cited

U.S. PATENT DOCUMENTS

| | | | |
|---|---|---|---|
| 2024/0015667 A1* | 1/2024 | Bavand | H04W 52/367 |
| 2024/0064738 A1* | 2/2024 | Myung | H04W 16/14 |
| 2024/0389033 A1* | 11/2024 | Bai | H04L 1/0009 |

OTHER PUBLICATIONS

WO 2022/064413 A1 (Year: 2022).*
WO 2022/240053 A1 (Year: 2022).*

* cited by examiner

*Primary Examiner* — Rushil P. Sampat
(74) *Attorney, Agent, or Firm* — Norton Rose Fulbright US LLP

(57) ABSTRACT

This disclosure provides systems, methods, and devices for wireless communication that support use of minimum effective isotropic radiated power (EIRP) constraints with lower precision phase shifters and/or amplitude control. In a first aspect, a method of wireless communication includes obtaining one or more system performance parameters from a serving network entity, wherein the one or more system performance parameters includes a minimum EIRP for uplink transmissions, calculating an estimated EIRP for one or more candidate uplink transmission configurations of the UE, selecting an uplink transmission configuration of the one or more candidate uplink transmission configuration in response to the estimated EIRP corresponding to the uplink transmission configuration meeting the minimum EIRP, and sending the uplink transmissions according to the uplink transmission configuration. Other aspects and features are also claimed and described.

30 Claims, 8 Drawing Sheets

METHODS FOR USE OF MINIMUM EFFECTIVE ISOTROPIC RADIATED POWER CONSTRAINTS WITH LOW-PRECISION PHASE SHIFTERS AND/OR AMPLITUDE CONTROL

TECHNICAL FIELD

Aspects of the present disclosure relate generally to wireless communication systems, and more particularly, to use of lower resolution phase shifters or amplitude control. Some features may enable and provide improved communications, including communication of minimum effective isotropic radiated power (EIRP) constraints for lower precision phase shifters and/or amplitude control.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station or other network entity.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus configured for wireless communication is disclosed. The apparatus includes at least one processor, and a memory coupled to the at least one processor. The at least one processor is configured to obtain one or more system performance parameters from a serving network entity, wherein the one or more system performance parameters includes a minimum effective isotropic radiated power (EIRP) for uplink transmissions, to calculate an estimated EIRP for one or more candidate uplink transmission configurations of the UE, to select an uplink transmission configuration of the one or more candidate uplink transmission configuration in response to the estimated EIRP corresponding to the uplink transmission configuration meeting the minimum EIRP, and to send the uplink transmissions according to the uplink transmission configuration.

In an additional aspect of the disclosure, a method of wireless communication includes obtaining one or more system performance parameters from a serving network entity, wherein the one or more system performance parameters includes a minimum EIRP for uplink transmissions, calculating an estimated EIRP for one or more candidate uplink transmission configurations of the UE, selecting an uplink transmission configuration of the one or more candidate uplink transmission configuration in response to the estimated EIRP corresponding to the uplink transmission configuration meeting the minimum EIRP, and sending the uplink transmissions according to the uplink transmission configuration.

In an additional aspect of the disclosure, an apparatus configured for wireless communication is disclosed. The apparatus includes means for obtaining one or more system performance parameters from a serving network entity, wherein the one or more system performance parameters includes a minimum EIRP for uplink transmissions, means for calculating an estimated EIRP for one or more candidate uplink transmission configurations of the UE, means for selecting an uplink transmission configuration of the one or more candidate uplink transmission configuration in response to the estimated EIRP corresponding to the uplink transmission configuration meeting the minimum EIRP, and means for sending the uplink transmissions according to the uplink transmission configuration.

In an additional aspect of the disclosure, a non-transitory computer-readable medium stores instructions that, when executed by a processor, cause the processor to perform operations including obtaining one or more system performance parameters from a serving network entity, wherein the one or more system performance parameters includes a minimum EIRP for uplink transmissions, means for calculating an estimated EIRP for one or more candidate uplink transmission configurations of the UE, means for selecting an uplink transmission configuration of the one or more candidate uplink transmission configuration in response to the estimated EIRP corresponding to the uplink transmission configuration meeting the minimum EIRP, and means for sending the uplink transmissions according to the uplink transmission configuration.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
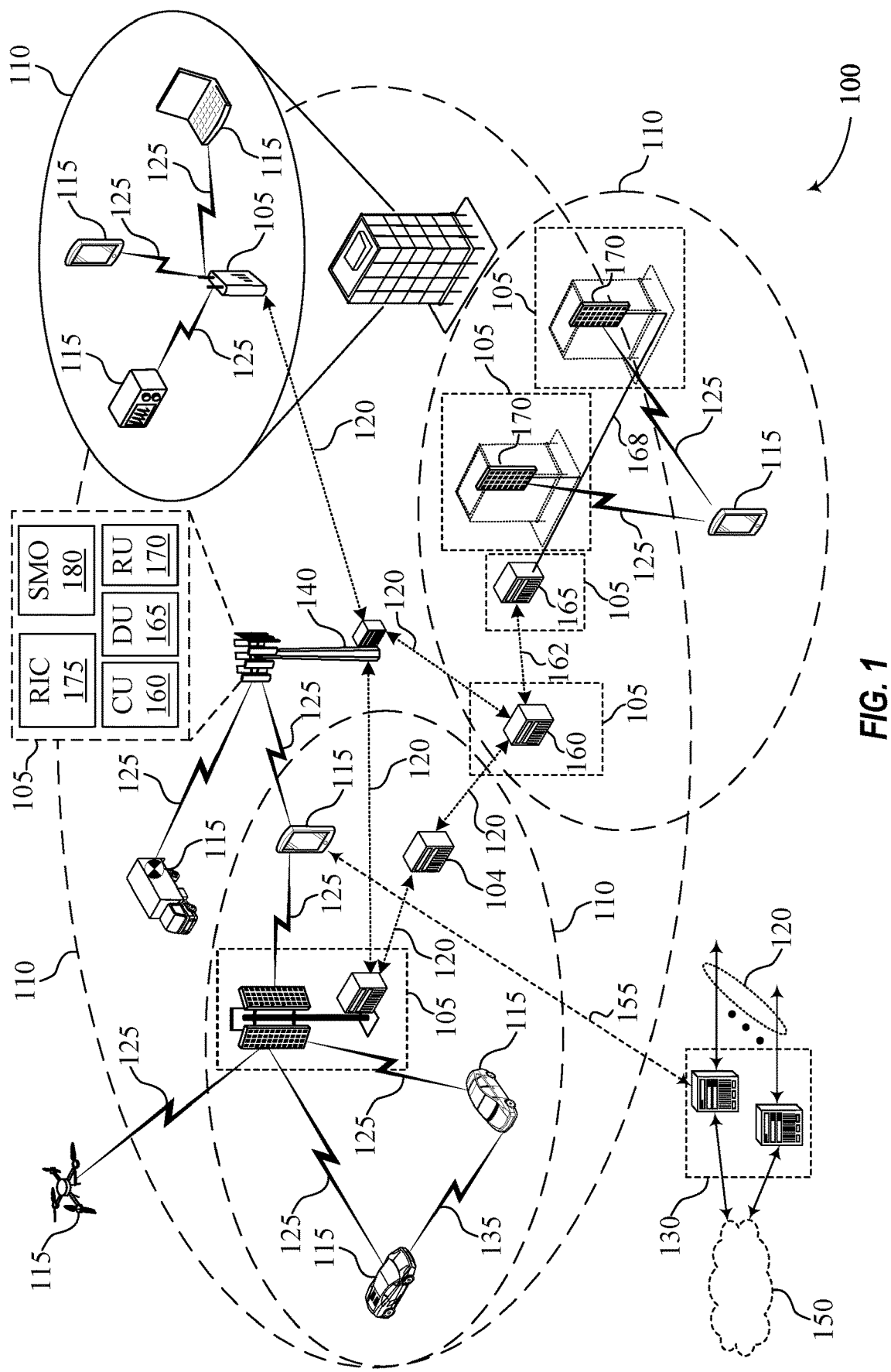
FIG. 1 illustrates an example of a wireless communications system that supports use of minimum effective isotropic radiated power (EIRP) constraints with lower precision phase shifters and/or amplitude control in accordance with one or more aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support use of minimum EIRP constraints with lower precision phase shifters and/or amplitude control. Particular implementations of the subject matter described in this disclosure may be implemented to realize one or more of the following potential advantages or benefits. In some aspects, the present disclosure provides techniques for use of minimum EIRP constraints with lower precision phase shifters and/or amplitude control. Because, as noted in greater detail below, changes to the resolution of phase shifters and/or amplitude control mechanisms may cause a significant change in the side lobe delta, between the peak array gain of the main lobe and the peak array gain of the sided lobe. The use of the minimum EIRP constraints allows a UE to not only increase power savings by selecting lower resolution phase shifter(s) and/or amplitude control, but may avoid selected resolutions that would not provide sufficient power to maintain an acceptable power to enable a side lobe delta sufficiently large enough to avoid undue interference with neighboring UE communications.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.126 GHZ-24.25 GHZ). Frequency bands falling within FR3 may inherit FR1 characteristics and/or FR2 characteristics, and, thus, may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x (52.6 GHz-71 GHZ), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmW" or the like if used herein may broadly represent frequencies that may include mid-band frequencies, may be within FR2, FR2x, FR4, and/or FR5, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmW transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports use of minimum effective isotropic radiated power (EIRP) constraints with lower precision phase shifters and/or amplitude control in accordance with one or more aspects of the present disclosure. Wireless communications system 100 may include one or more network entities 105, one or more UEs 115, and a core network 130. In some examples, wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

Network entities 105 may be dispersed throughout a geographic area to form wireless communications system 100 and may include devices in different forms or having different capabilities. In 3GPP, the term "cell" may refer to this particular geographic coverage area of a network entity, such as network entities 105, or a network entity subsystem serving the coverage area, depending on the context in which the term is used. In various examples, network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, network entity 105 may support a coverage area 110 (e.g., a geographic coverage area) over which UEs 115 and network entity 105 may establish one or more communication links 125. Coverage area 110 may be an example of a geographic area over which network entity 105 and UE 115 may support the communication of signals according to one or more radio access technologies (RATs).

UEs 115 may be dispersed throughout coverage area 110 of the wireless communications system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115 or network entities 105, as shown in FIG. 1.

As described herein, a node of wireless communications system 100, which may be referred to as a network node, or a wireless node, may be network entity 105 (e.g., any network entity described herein), UE 115 (e.g., any UE described herein), a network controller, an apparatus, a device, a computing system, one or more components, or another suitable processing entity configured to perform any of the techniques described herein. For example, a node may be UE 115. As another example, a node may be network entity 105. As another example, a first node may be configured to communicate with a second node or a third node. In one aspect of this example, the first node may be UE 115, the second node may be network entity 105, and the third node may be UE 115. In another aspect of this example, the first node may be UE 115, the second node may be network entity 105, and the third node may be network entity 105. In yet other aspects of this example, the first, second, and third nodes may be different relative to these examples. Similarly, reference to UE 115, network entity 105, apparatus, device, computing system, or the like may include disclosure of UE 115, network entity 105, apparatus, device, computing system, or the like being a node. For example, disclosure that UE 115 is configured to receive information from network entity 105 also discloses that a first node is configured to receive information from a second node.

In some examples, network entities 105 may communicate with core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over backhaul communication link 120 (e.g., in accordance with an X2, Xn, or other interface protocol) either directly (e.g., directly between network entities 105) or indirectly (e.g., via core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. Backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. UE 115 may communicate with core network 130 through a communication link 155.

One or more of network entities 105 described herein may include or may be referred to as base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, network entity 105 (e.g., base station 140) may be implemented in an aggregated (e.g., monolithic, standalone) base station architecture, which may be configured to utilize a protocol stack that is physically or logically integrated within a single network entity 105 (e.g., a single RAN node, such as base station 140).

In some examples, network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. RU 170 may also be referred to as a radio head, a smart radio head, a remote radio head (RRH), a remote radio unit (RRU), or a transmission reception point (TRP). One or more components of network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between CU 160, DU 165, and RU 175 is flexible and may support different functionalities depending upon which functions (e.g., network layer functions, protocol layer functions, baseband functions, RF functions, and any combinations thereof) are performed at CU 160, DU 165, or RU 175. For example, a functional split of a protocol stack may be employed between CU 160 and DU 165 such that CU 160 may support one or more layers of the protocol stack and DU 165 may support one or more different layers of the protocol stack. In some examples, CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). CU 160 may be connected to one or more DUs 165 or RUs 170, and one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by CU 160.

Additionally, or alternatively, a functional split of the protocol stack may be employed between DU 165 and RU 170 such that DU 165 may support one or more layers of the protocol stack and RU 170 may support one or more different layers of the protocol stack. DU 165 may support one or multiple different cells (e.g., via one or more RUs 170). In some cases, a functional split between CU 160 and DU 165, or between DU 165 and RU 170 may be within a protocol layer (e.g., some functions for a protocol layer may be performed by one of CU 160, DU 165, or RU 170, while other functions of the protocol layer are performed by a different one of CU 160, DU 165, or RU 170). CU 160 may be functionally split further into CU control plane (CU-CP) and CU user plane (CU-UP) functions. CU 160 may be connected to one or more DUs 165 via midhaul communication link 162 (e.g., F1, F1-c, F1-u), and DU 165 may be connected to one or more RUs 170 via fronthaul communication link 168 (e.g., open fronthaul (FH) interface). In some examples, midhaul communication link 162 or fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of RU 170) of IAB node 104 used for access via DU 165 of IAB node 104 (e.g., referred to as virtual IAB-MT (vIAB-MT)). In some examples, IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between core network 130 and the AN (e.g., via a wired or wireless connection to core network 130). That is, an IAB donor may refer to a RAN node with a wired or wireless connection to core network 130. The IAB donor may include CU 160 and at least one DU 165 (e.g., and RU 170), in which case CU 160 may communicate with core network 130 over an interface (e.g., a backhaul link). IAB donor and IAB nodes 104 may communicate over an F1 interface according to a protocol that defines signaling messages (e.g., an F1 AP protocol). Additionally, or alternatively, CU 160 may communicate with the core network over an interface, which may be an example of a portion of backhaul link, and may communicate with other CUs 160 (e.g., CU 160 associated with an alternative IAB donor) over an Xn-C interface, which may be an example of a portion of a backhaul link.

IAB node 104 may refer to a RAN node that provides IAB functionality (e.g., access for UEs 115, wireless self-backhauling capabilities). DU 165 may act as a distributed scheduling node towards child nodes associated with IAB node 104, and the IAB-MT may act as a scheduled node towards parent nodes associated with IAB node 104. That is, an IAB donor may be referred to as a parent node in communication with one or more child nodes (e.g., an IAB donor may relay transmissions for UEs through one or more other IAB nodes 104). Additionally, or alternatively, IAB node 104 may also be referred to as a parent node or a child node to other IAB nodes 104, depending on the relay chain or configuration of the AN. Therefore, the IAB-MT entity of IAB nodes 104 may provide a Uu-interface for a child IAB node 104 to receive signaling from parent IAB node 104, and the DU interface (e.g., DUs 165) may provide a Uu-interface for parent IAB node 104 to signal to child IAB node 104 or UE 115.

For example, IAB node 104 may be referred to as a parent node that supports communications for a child IAB node, and referred to as a child IAB node associated with an IAB donor. The IAB donor may include CU 160 with a wired or wireless connection (e.g., backhaul communication link 120) to core network 130 and may act as parent node to IAB nodes 104. For example, DU 165 of IAB donor may relay transmissions to UEs 115 through IAB nodes 104, and may directly signal transmissions to UE 115. CU 160 of IAB donor may signal communication link establishment via an F1 interface to IAB nodes 104, and IAB nodes 104 may schedule transmissions (e.g., transmissions to UEs 115 relayed from the IAB donor) through DUs 165. That is, data may be relayed to and from IAB nodes 104 via signaling over an NR Uu-interface to MT of IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support scheduling requests for spatial multiplexing as described herein. For example, some operations described as being performed by UE 115 or network entity 105 (e.g., base station 140) may additionally, or alternatively, be performed by one or more components of the disaggregated RAN architecture (e.g., IAB nodes 104, DUs 165, CUs 160, RUs 170, RIC 175, SMO 180).

UE 115 may include or may be referred to as a mobile device, a wireless device, a remote device, a handheld device, or a subscriber device, or some other suitable terminology, where the "device" may also be referred to as a unit, a station, a terminal, or a client, among other examples. UE 115 may also include or may be referred to as a personal electronic device such as a cellular phone, a personal digital assistant (PDA), a tablet computer, a laptop computer, or a personal computer. In some examples, UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

UEs 115 described herein may be able to communicate with various types of devices, such as other UEs 115 that may sometimes act as relays as well as network entities 105 and the network equipment including macro eNBs or gNBs, small cell eNBs or gNBs, or relay base stations, among other examples, as shown in FIG. 1.

UEs 115 and network entities 105 may wirelessly communicate with one another via one or more communication links 125 (e.g., an access link) over one or more carriers. The term "carrier" may refer to a set of RF spectrum resources having a defined physical layer structure for supporting communication links 125. For example, a carrier used for communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communications system 100 may support communication with UE 115 using carrier aggregation or multi-carrier operation. UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between network entity 105 and other devices may refer to communication between the devices and any portion (e.g., entity, sub-entity) of network entity 105. For example, the terms "transmitting," "receiving," or "communicating," when referring to network entity 105, may refer to any portion of network entity 105 (e.g., base station 140, CU 160, DU 165, RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with UE 115.

One or more numerologies for a carrier may be supported, where a numerology may include a subcarrier spacing ($\Delta f$) and a cyclic prefix. A carrier may be divided into one or more BWPs having the same or different numerologies. In some examples, UE 115 may be configured with multiple BWPs. In some examples, a single BWP for a carrier may be active at a given time and communications for UE 115 may be restricted to one or more active BWPs.

The time intervals for network entities 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of UEs 115. For example, one or more of UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of UEs 115.

In some examples, network entity 105 (e.g., base station 140, RU 170) may be movable and therefore provide communication coverage for a moving one of coverage areas 110. In some examples, a different one of coverage areas 110 associated with different technologies may overlap, but the different one of coverage areas 110 may be supported by the same one of network entities 105. In some other examples, the overlapping coverage areas 110 associated with different technologies may be supported by different ones of network entities 105. Wireless communications system 100 may include, for example, a heterogeneous network in which different types of network entities 105 provide coverage for various coverage areas 110 using the same or different radio access technologies.

Some of UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or network entity 105 (e.g., base station 140) without human intervention. In some examples, M2M communication or MTC may include communications from devices that integrate sensors or meters to measure or capture information and relay such information to a central server or application program that makes use of the information or presents the information to humans interacting with the application program. Some of UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some of UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some of UEs 115 may be configured for operation using a narrowband protocol type that is associated with a defined portion or range (e.g., set of subcarriers or resource blocks (RBs)) within a carrier, within a guard-band of a carrier, or outside of a carrier.

Wireless communications system 100 may be configured to support ultra-reliable communications or low-latency communications, or various combinations thereof. For example, wireless communications system 100 may be configured to support ultra-reliable low-latency communications (URLLC). UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within coverage area 110 of network entity 105 (e.g., base station 140, RU 170), which may support aspects of such D2D communications being configured by or scheduled by network entity 105. In some examples, one or more UEs 115 in such a group may be outside coverage area 110 of network entity 105 or may be otherwise unable to or not configured to receive transmissions from network entity 105. In some examples, groups of UEs 115 communicating via D2D communications may support a one-to-many (1:M) system in which each UE 115 transmits to each of the other ones of UEs 115 in the group. In some examples, network entity 105 may facilitate the scheduling of resources for D2D communications. In some other examples, D2D communications may be carried out between UEs 115 without the involvement of network entity 105.

In some systems, D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

Core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 served by network entities 105 (e.g., base stations 140) associated with core network 130. User IP packets may be transferred through the user plane entity, which may provide IP address allocation as well as other functions. The user plane entity may be connected to IP services 150 for one or more network operators. IP services 150 may include access to the Internet, Intranet(s), an IP Multimedia Subsystem (IMS), or a Packet-Switched Streaming Service.

Wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

Wireless communications system 100 may utilize both licensed and unlicensed RF spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as network entities 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

Network entity 105 (e.g., base station 140, RU 170) or UE 115 may be equipped with multiple antennas, which may be used to employ techniques such as transmit diversity, receive diversity, multiple-input multiple-output (MIMO) communications, or beamforming. The antennas of network entity 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with network entity 105 may be located in diverse geographic locations. Network entity 105 may have an antenna array with a set of rows and columns of antenna ports that network entity 105 may use to support beamforming of communications with UE 115. Likewise, UE 115 may have one or more antenna arrays that may support various MIMO or beamforming operations. Additionally, or alternatively, an antenna panel may support RF beamforming for a signal transmitted via an antenna port.

Network entities 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., network entity 105, UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Network entity 105 or UE 115 may use beam sweeping techniques as part of beamforming operations. For example, network entity 105 (e.g., base station 140, RU 170) may use multiple antennas or antenna arrays (e.g., antenna panels) to conduct beamforming operations for directional communications with UE 115. Some signals (e.g., synchronization signals, reference signals, beam selection signals, or other control signals) may be transmitted by network entity 105 multiple times along different directions. For example, network entity 105 may transmit a signal according to different beamforming weight sets associated with different directions of transmission. Transmissions along different beam directions may be used to identify (e.g., by a transmitting device, such as network entity 105, or by a receiving device, such as UE 115) a beam direction for later transmission or reception by network entity 105.

Some signals, such as data signals associated with a particular receiving device, may be transmitted by a transmitting device (e.g., transmitting network entity 105, transmitting UE 115) along a single beam direction (e.g., a direction associated with the receiving device, such as receiving network entity 105 or receiving UE 115). In some examples, the beam direction associated with transmissions along a single beam direction may be determined based on a signal that was transmitted along one or more beam directions. For example, UE 115 may receive one or more of the signals transmitted by network entity 105 along different directions and may report to network entity 105 an indication of the signal that UE 115 received with a highest signal quality or an otherwise acceptable signal quality.

In some examples, transmissions by a device (e.g., by network entity 105 or UE 115) may be performed using multiple beam directions, and the device may use a combination of digital precoding or beamforming to generate a combined beam for transmission (e.g., from network entity 105 to UE 115). The UE 115 may report feedback that indicates precoding weights for one or more beam directions, and the feedback may correspond to a configured set of beams across a system bandwidth or one or more sub-bands. Network entity 105 may transmit a reference signal (e.g., a cell-specific reference signal (CRS), a channel state information reference signal (CSI-RS)), which may be precoded or unprecoded. UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by network entity 105 (e.g., base station 140, RU 170), UE 115 may employ similar techniques for transmitting signals multiple times along different directions (e.g., for identifying a beam direction for subsequent transmission or reception by UE 115) or for transmitting a signal along a single direction (e.g., for transmitting data to a receiving device).

A receiving device (e.g., UE 115) may perform reception operations in accordance with multiple receive configurations (e.g., directional listening) when receiving various signals from a receiving device (e.g., network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between UE 115 and network entity 105 or core network 130 supporting radio bearers for user plane data. At the PHY layer, transport channels may be mapped to physical channels.

UEs 115 and network entities 105 may support retransmissions of data to increase the likelihood that data is received successfully. Hybrid automatic repeat request (HARQ) feedback is one technique for increasing the likelihood that data is received correctly over a communication link (e.g., communication link 125, D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
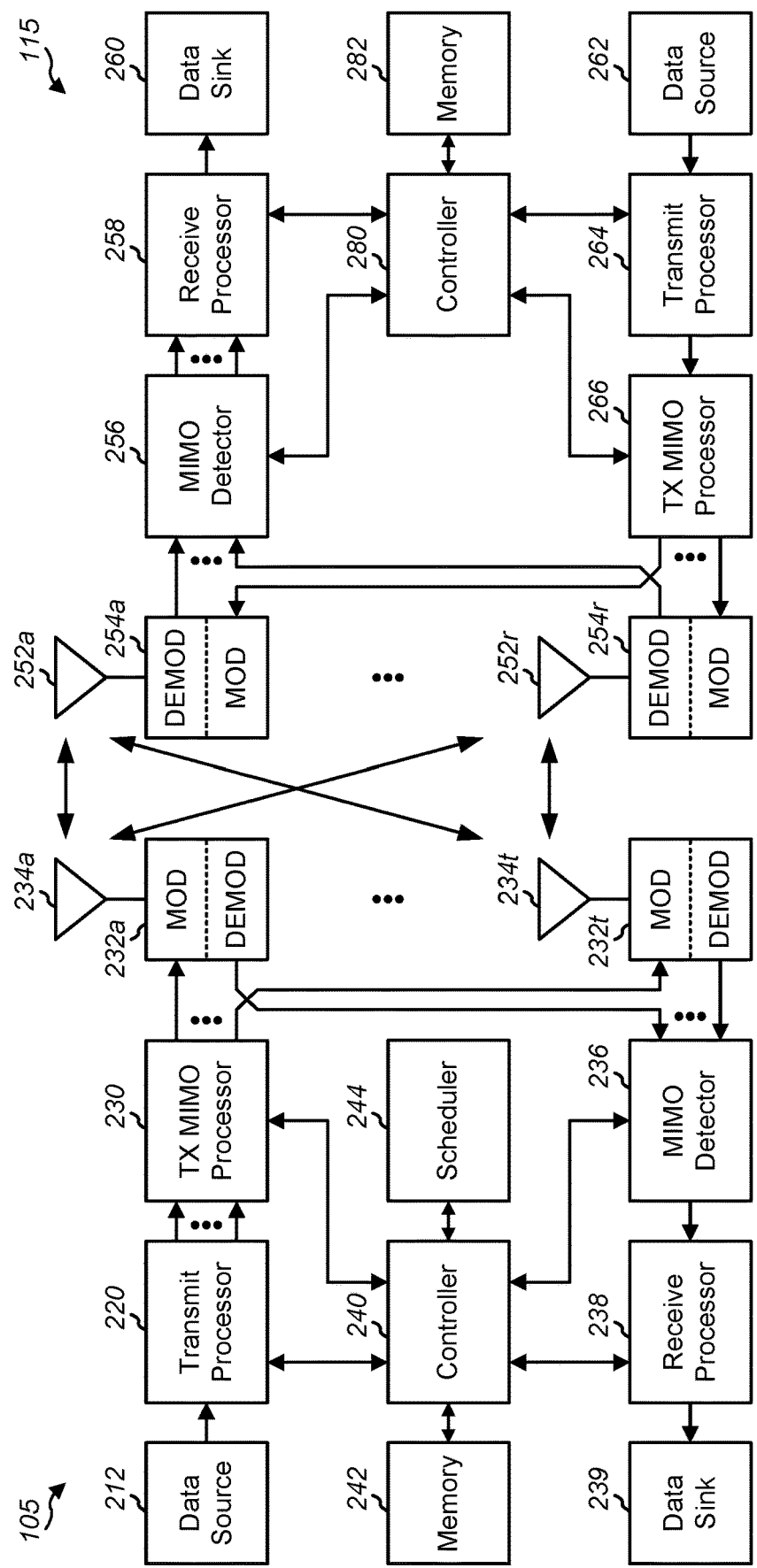
FIG. 2 is a block diagram illustrating examples of base station 140 and UE 115 that may support use of minimum effective isotropic radiated power (EIRP) constraints with lower precision phase shifters and/or amplitude control according to one or more aspects.

FIG. 2 is a block diagram illustrating examples of base station 140 and UE 115 that may support use of minimum effective isotropic radiated power (EIRP) constraints with lower precision phase shifters and/or amplitude control according to one or more aspects. Base station 140 and UE 115 may be any of the network entities and base stations and one of the UEs in FIG. 1. For a restricted association scenario (as mentioned above), network entity 105 may be small cell base station, and UE 115 may be UE 115 operating in a service area of the small cell base station, which in order to access the small cell base station, would be included in a list of accessible UEs for the small cell base station. Base station 140 may also be a base station of some other type. As shown in FIG. 2, a network entity 105, such as base station 140 may be equipped with antennas 234a through 234t, and UE 115 may be equipped with antennas 252a through 252r for facilitating wireless communications.

At base station 140, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 140 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to network entity 105. At network entity 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 140 and UE 115, respectively. Controller 240 or other processors and modules at base station 140 or controller 280 or other processors and modules at UE 115 may perform or direct the execution of various processes for the techniques described herein, such as to perform or direct the execution illustrated in FIG. 3, or other processes for the techniques described herein. Memories 242 and 282 may store data and program codes for base station 140 and UE 115, respectively. Scheduler 244 may schedule UEs for data transmission on the downlink or the uplink.

In some cases, UE 115 and base station 140 may operate in a shared radio frequency spectrum band, which may include licensed or unlicensed (e.g., contention-based) frequency spectrum. In an unlicensed frequency portion of the shared radio frequency spectrum band, UEs 115 or base station 140 may traditionally perform a medium-sensing procedure to contend for access to the frequency spectrum. For example, UE 115 or base station 140 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2

LBT), which may also be referred to as an abbreviated LBT, a single-shot LBT, a 16-μs, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, network entities 105 and UEs 115 may be operated by the same or different network operating entities. In some examples, an individual network entity 105 or UE 115 may be operated by more than one network operating entity. In other examples, each network entity 105 and UE 115 may be operated by a single network operating entity. Requiring each network entity 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

5G NR communication technologies include many advanced features, including directional energy or beam steering. Discrete Fourier transform (DFT) beam weights or minor variants of DFT beam weights are typically used for the directional energy/beam steering features, such as in millimeter wave and other communication systems. These beam weights will generally have predictable beam properties, including a peak array gain of $10 \log_{10}(N)$ dB, where N represents the array dimension, a first side lobe delta of approximately 13.2 dB relative to the main lobe, a 3-dB beamwidth of the main lobe of approximately 100/N degrees. These properties assume an infinite-bit phase precision or, at least a large phase precision. Existing 5G compatible chipsets are manufactured assuming a B-bit phase shifter, where B is often between a 3- to 5-bit precision. Amplitude control is typically implemented to have at least 8 levels, which corresponds to a 3-bit precision, but may also be implemented with greater precision (e.g., 4-bit, etc.).

In many scenarios, phase shifters and/or amplitude control can be of low-complexity or low resolution even in cellular applications. For example, lower resolution phase shifters and/or amplitude control consume less power, need less area on the chip, and, hence, can provide competitive advantage for some original equipment manufacturer (OEM) designs. In particular, a 2-bit phase shifter (B=2) uses either the in-phase (I) or quadrature (Q) signals, given that the beam weights are 1, i, −1 and −i. A 3-bit phase shifter (B=3) uses both I and Q signals over multiple stages of phase shifting. Thus, lower resolution phase shifters and/or amplitude control (such as $B \le 3$) may typically be considered for NR-Light or Internet of Things (IoT) applications in order to reduce costs and/or power consumption.

In another example, some 5G systems can be designed using WiFi chipsets (e.g., 802.11 ad/ay compatible chipsets) where 2-bit phase shifter resolution (B=2) may be sufficient, because such deployments are typically in indoor settings with reduced path losses. From a network perspective, certain beam choices may become untenable for communications hardware that uses such low-resolution phase shifters and/or amplitude control. The aspects described herein propose that the network entity or gNB indicates a constraint on the allowed minimum EIRP to ensure that certain untenable beam choices are avoided.

A B-bit resolution phase shifter typically uses B stages of radio frequency (RF) circuitry to enable the phase shifting operation. Thus, higher precision (e.g., $B \ge 5$-bit) phase shifters would use more integrated circuit (IC) chip or substrate area than lower precision (e.g., $B \le 3$-bit) phase shifters. Reduced area on an IC chip may translate to cost savings in volume manufacturing. In additional to potential cost savings associated with IC chip area, lower precision phase shifters generally use less power, and, thus, may provide the network device with power savings. For example, B=2-bit phase shifters that use 0°, 90°, 180°, and 270° as nominal phase values would turn on either the I or Q signals (and not both) as the beam weights corresponding to these phases are 1, i, −1, and −i. Similar power savings results are seen with a B=3-bit phase shifter relative to the higher-precision (e.g., B>3-bit) phase shifters. Lower resolution phase shifters (e.g., ≤3-bit) are typically considered in manufacture of NR-Light and/or IoT devices or applications in order to reduce cost and/or power.

Implementation of phase shifters in wireless communication network equipment allows for phase shifter quantization to be dynamically configured. An approximate 30% power savings can be realized using a lower precision phase shifter (e.g., ≤3-bit) relative to a higher precision phase shifter (e.g., B≥5-bit). This approximate 30% characterization may be a function of the type of semiconductor manufacturing technology used (e.g., CMOS or SiGe) and the power savings characterization could be even more substantial at higher carrier frequencies (e.g., 140 GHz), which use a III-V semiconductor process node (e.g., GaAs, GaN, etc.). However, of that power consumption, phase shifters typically consume a smaller amount of power, relative to the RF chain, at millimeter wave frequencies and beyond. In addition, phase shifters may consume a bigger fraction of power on the receive path rather than the transmit path. Because the bandwidth of receive path components (e.g., low-noise amplifiers (LNAs), etc.) could be larger than the bandwidth of transmit path components (e.g., power amplifiers (PAS)), in communication systems affording ultra-wide bandwidth coverage (e.g., greater than 10 GHz, such as those at FR4), more antenna elements could have receive path operations than for the transmit path. Thus, the power consumption associated with phase shifters can quickly add up at these higher frequencies.

Dynamic configuration of amplitude control quantization is also available for wireless communication network equipment. Power savings may be realized by sub-sampling of amplitude stages from the set of all possible amplitudes that can be configured with the RF circuitry. The specified capability for dynamic configuration of amplitude control includes three parts. (1) the range of amplitude control, which defines the difference or range between smallest and largest quantized amplitude value; (2) the resolution or step size, which captures the gap between adjacent quantized values of amplitude; and (3) the accuracy, which captures the spread over which random errors can occur in quantization due to RF hardware issues. The resolution and accuracy parts can also be non-uniform with closely-spaced quantized values at one end of the range between smallest and largest quantized amplitude value and further-spaced quantized values at the other end of the range.

In one example of amplitude control quantization, assume an amplitude control with B=3-bit with a 1 dB step size and perfect precision beginning at −6.02 dB. By implementing a sub-sampling approach of a B=2-bit amplitude control with a 1 dB step size, power savings can be achieved as parts of the RF circuitry are turned off when the bit size is reduced from B=3 to B=2. As shown in Table 1, below, the B=3-bit amplitude control results in 8 quantized amplitude levels, while the sub-sampling with B=2-bit amplitude control results in 4 quantized amplitude levels with the portions of the RF circuitry that would support the remaining 4 (levels 5-8) of the B=3-bit amplitude control being turned off, thus saving power.

TABLE 1

| Quantization Levels | Uniform in dB (at B = 3) | Uniform in dB (at B = 2, w/ sub-sampling) |
| --- | --- | --- |
| 1 | −6.02 | −6.02 |
| 2 | −7.02 | −7.02 |
| 3 | −8.02 | −8.02 |
| 4 | −9.02 | −9.02 |
| 5 | −10.02 | — |
| 6 | −11.02 | — |
| 7 | −12.02 | — |
| 8 | −13.02 | — |

In many low-cost NR-Light or IoT devices/applications, lower resolution phase shifters and/or lower resolution amplitude control (e.g., B≤3-bit) may be used. More typically, a higher resolution phase shifter and/or amplitude control (e.g., B≥5-bit) are used in the manufacture of the device or application, while a lower resolution status would be dynamically selected for operation. For example, a UE manufactured with a higher resolution phase shifter (e.g., B=5-bit) may select a lower resolution setting (e.g., B=2) of the phase shifter at times and may select a higher resolution setting (e.g., B=3-bit) at $time_2$. Such a dynamic selection may be made for different reasons, such as power savings reasons (e.g., the UE has a lower battery life) or for performance reasons. Various aspects of the present disclosure are directed to use of minimum EIRP constraints with lower precision phase shifters and/or amplitude control.

Figure 3:
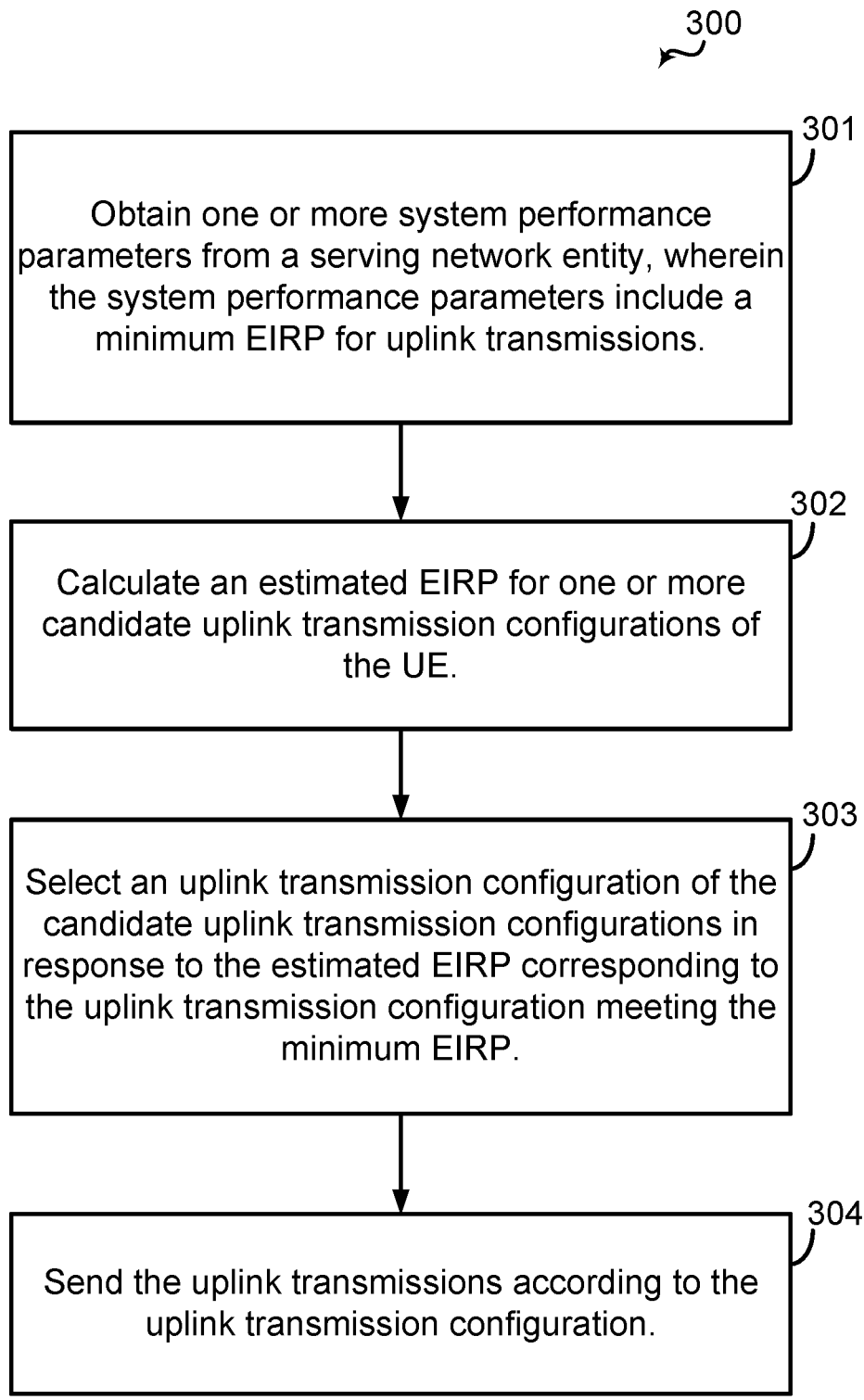
FIG. 3 is a flow diagram illustrating an example process that supports dynamic resolution adjustment phase shifters and/or amplitude controls level and the use of minimum EIRP constraints with lower precision phase shifters and/or amplitude control according to one or more aspects.

FIG. 3 is a flow diagram illustrating an example process 300 that supports dynamic resolution adjustment phase shifters and/or amplitude controls level and the use of minimum effective isotropic radiated power (EIRP) constraints with lower precision phase shifters and/or amplitude control according to one or more aspects. Operations of process 300 may be performed by a UE, such as UE 115 described above with reference to FIGS. 1, 2, or a UE described with reference to FIG. 8. For example, example operations (also referred to as "blocks") of process 300 may enable UE 115 to support power headroom differential reporting for reference resource signals transmitted at different transmission power than other uplink transmissions.

Figure 8:
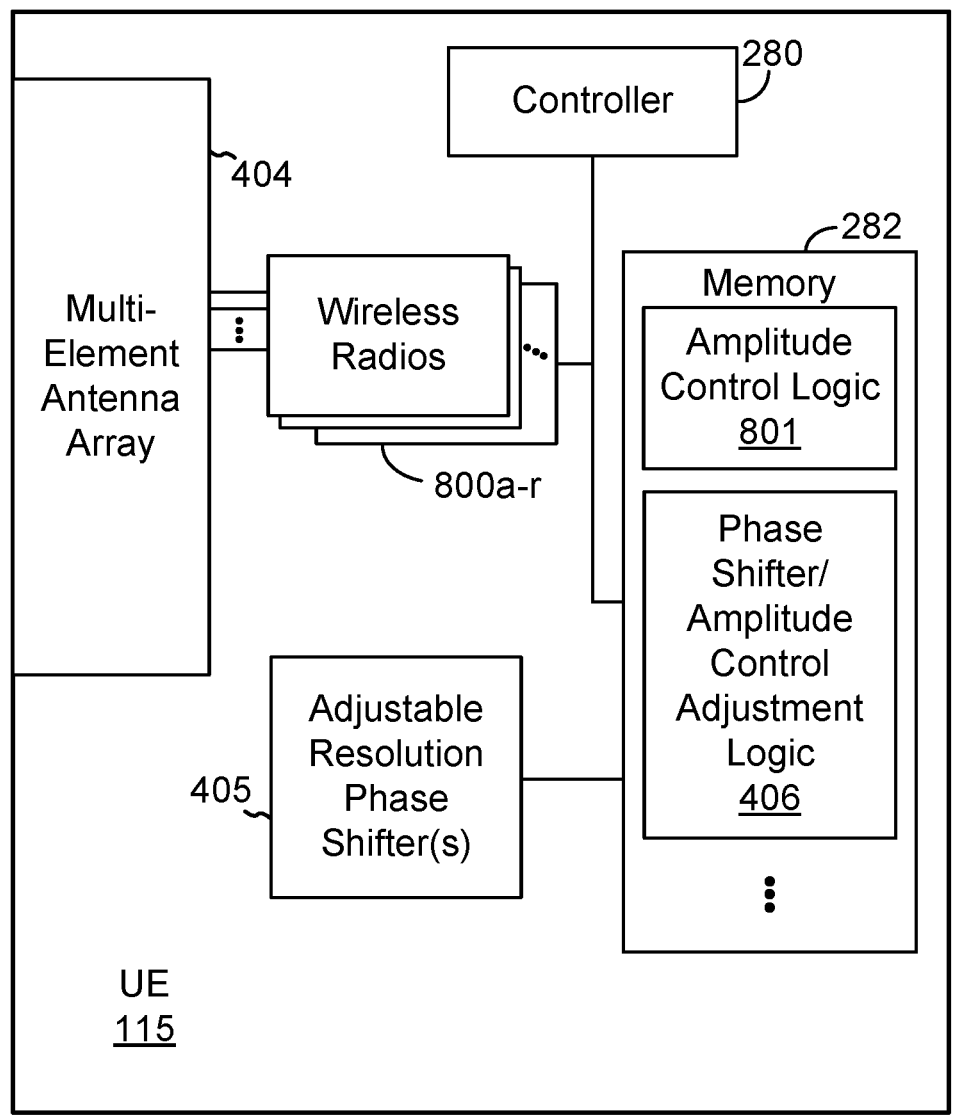
FIG. 8 is a block diagram of an example UE 115 that supports dynamic resolution adjustment phase shifters and/or amplitude controls level and the use of minimum EIRP constraints with lower precision phase shifters and/or amplitude control according to one or more aspects.

FIG. 8 is a block diagram of an example UE 115 that supports dynamic resolution adjustment phase shifters and/or amplitude controls level and the use of minimum EIRP constraints with lower precision phase shifters and/or amplitude control according to one or more aspects. UE 115 may be configured to perform operations, including the blocks of a process described with reference to FIG. 3. In some implementations, UE 115 includes the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 800a-r, and multi-element antenna array, which may include antennas, such as antennas 252a-r in FIG. 2. Wireless radios 800a-r may include various other components and hardware, as illustrated in FIG. 2 for UE 115, including modulator and demodulators 254a-r, MIMO detector 256, receive processor 258, transmit processor 264, and TX MIMO processor 266.

As shown, memory 282 may include amplitude control logic 801 and phase shifter/amplitude control adjustment logic 406. Amplitude control logic 801 may include code and instructions, which, when executed by controller 280 (referred to as the "execution environment" of amplitude control logic 801), enables UE 115 to control the quantization of amplitude for uplink transmissions. As noted above, amplitude control mechanisms, which are implemented within the execution environment of amplitude control logic 801, may be set to a 3-bit resolution, which supports up to 8 amplitude levels. The execution environment of amplitude control logic 801 according to one or more aspects herein may support UE 115 selecting to use lower amplitude control, such as 2-bits, which would support up to 4 amplitude levels, or even a higher resolution, such as 4-bit or higher, which would support up to 16 levels or more (for higher than 4-bit resolution).

Phase shifter/amplitude control adjust logic 406, when executed by controller 280, implements UE 115 with the functionality for use of minimum EIRP constraints with lower precision phase shifters and/or amplitude control. Within the execution environment of phase shifter/amplitude control adjustment logic 406, upon receiving an indication of the minimum EIRP from a serving network entity, UE 115 may either or both change the resolution of adjustable resolution phase shifter(s) 405 (either higher or lower) or change the resolution used within the execution environment of amplitude control logic 801 (again, either higher or lower). It should be noted that, in additional aspects of the present disclosure, the execution environment of phase shifter/amplitude control adjustment logic 801 may allow UE 115 dynamically change the resolution of adjustable resolution phase shifter(s) 405 and or dynamically change the resolution used within the execution environment of amplitude control logic 801 in response to certain conditions, such as to implement power savings when UE 115 has a low battery level, or in response to predetermined operations, such as in response to a wake-up signal detection, initial or handover cell search procedures, and the like.

At block 301, a UE obtains one or more system performance parameters from a serving network entity, wherein the one or more system performance parameters includes a minimum EIRP for uplink transmissions. A UE, such as UE 115 (FIG. 9), under control of controller 280, may execute phase shifter/amplitude control adjustment logic 406, stored in memory 282. The execution environment of phase shifter/amplitude control adjustment logic 406 implements the functionality of aspects of the present disclosure at UE 115. Signals from a serving network entity may be received at UE 115 via multi-element antenna array 404 and wireless radios 800*a-r*. Within the execution environment of phase shifter/amplitude control adjustment logic 406, UE 115 recognizes the system performance parameters including a minimum EIRP for uplink transmissions.

At block 302, the UE calculates an estimated EIRP for one or more candidate uplink transmission configurations of the UE. Prior to conducting uplink transmissions, UE 115 may determine its transmission configuration, including transmit power, array size for the transmissions via multi-element antenna array 404, phase shifter resolution, amplitude control levels, and the like. The determination of transmission configuration may include consideration of channel conditions, beam formation, power savings, and the like. Within the execution environment of phase shifter/amplitude control adjustment logic 406, UE 115 calculates a number of estimated EIRPs resulting from various combinations of transmission configuration parameters in preparation for determining the ultimate transmission configuration.

At block 303, the UE selects an uplink transmission configuration of the one or more candidate uplink transmission configuration in response to the estimated EIRP corresponding to the uplink transmission configuration meeting the minimum EIRP. Under control of controller 280, UE 115 compares the number of estimated EIRPs with the minimum EIRP provided by the serving network entity. In so doing, UE 115 may reject the transmission configurations that result in an estimated EIRP below the threshold of the minimum set by the network entity. Within the execution environment of phase shifter/amplitude control adjustment logic 406, UE 115 may select the combination of transmission parameters that result in an estimated EIRP that meets the threshold of the minimum EIRP and further satisfies other consideration of UE 115 for transmissions, as referenced above. The selection of transmission configuration parameters may include adjusting, under control of controller 280, the resolutions of adjustable resolution phase shifter(s) 405. Selection of transmission configuration parameters may also include, either alternatively or in addition to adjustment of adjustable resolution phase shifter(s) 405, execution, under control of controller 280, of amplitude control logic 801, stored in memory 282. Within the execution environment of amplitude control logic 801, UE 115 may select a resolution of the amplitude controls to a lower resolution (e.g., <3-bits) or a higher resolution (e.g., ≥3-bits). Selection of the transmission configuration parameters may further inform UE 115, within the execution environment of phase shifter/amplitude control adjustment logic 406, UE 115, under control of controller 280 and wireless radios 800*a-r*, to select an array size and configuration of antenna elements of multi-element antenna array 404, for an uplink transmission that meets the minimum EIRP.

At block 304, the UE sends the uplink transmissions according to the uplink transmission configuration. Once the transmission configuration parameters have been selected at block 303, UE 115 may perform uplink transmissions according to the uplink transmission configuration in order to meet the minimum EIRP provided by the network entity.

As described with reference to FIG. 3, the present disclosure provides techniques for use of minimum EIRP constraints with lower precision phase shifters and/or amplitude control. Because, as noted in greater detail below, changes to the resolution of phase shifters and/or amplitude control mechanisms may cause a significant change in the side lobe delta, between the peak array gain of the main lobe and the peak array gain of the sided lobe. The use of the minimum EIRP constraints allows a UE to not only increase power savings by selecting lower resolution phase shifter(s) and/or amplitude control, but may avoid selected resolutions that would not provide sufficient power to maintain an acceptable power to enable a side lobe delta sufficiently large enough to avoid undue interference with neighboring UE communications.

Figure 4:
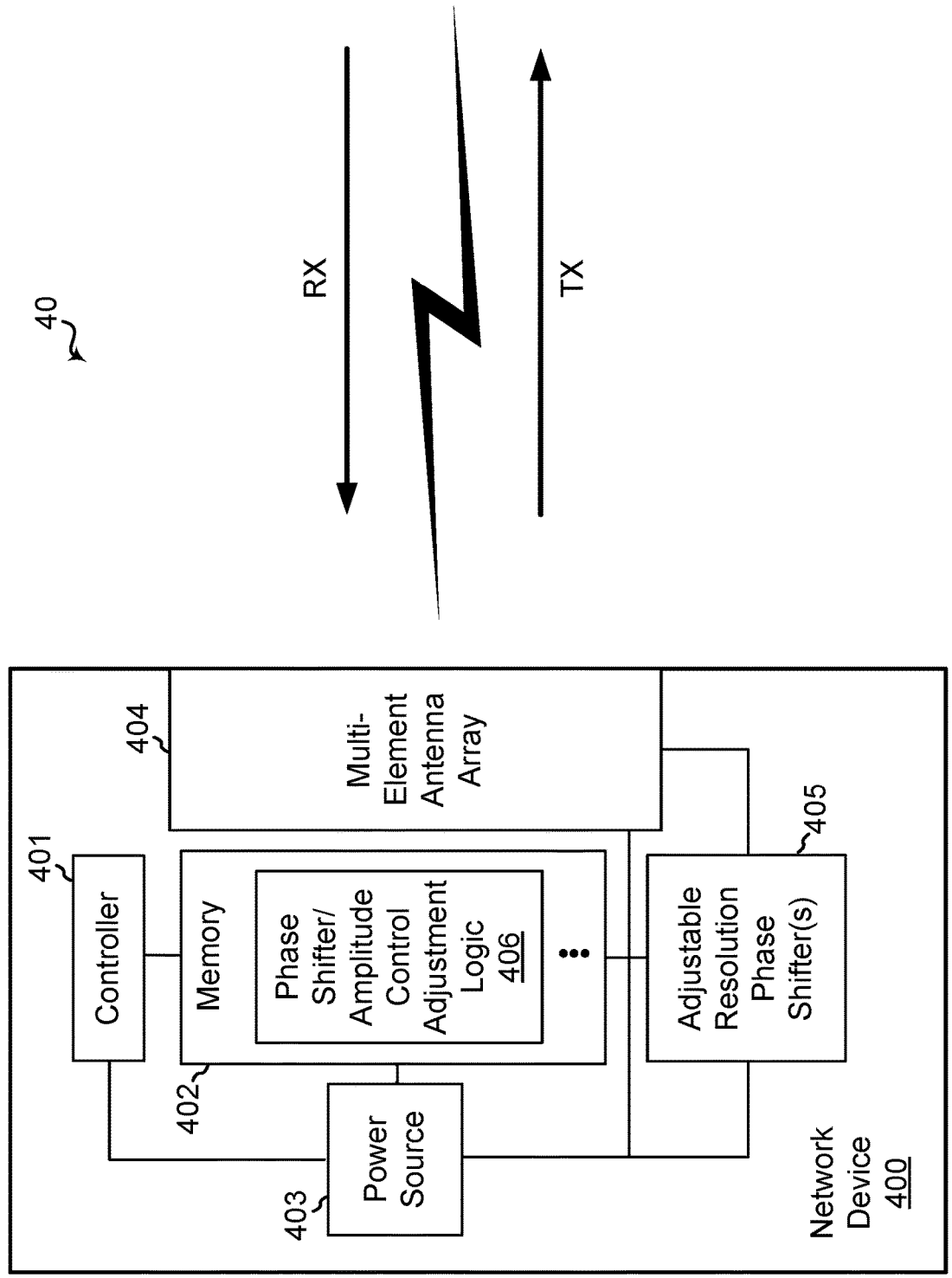
FIG. 4 is a block diagram illustrating a network device configured to provide use of minimum EIRP constraints with lower precision phase shifters and/or amplitude control according to one or more aspects.

FIG. 4 is a block diagram illustrating a network device 400 configured to provide use of minimum EIRP constraints with lower precision phase shifters and/or amplitude control according to one or more aspects. Network device 400 may include a network entity, base station, gNB, access point, UE, transmission-reception point (TRP), relay, or the like. Network device 400 includes a controller 401, which includes one or more processors that executed source code in memory 402 or other code or firmware in components of network device, the execution of which provides the features and functionality of network device. 400. Network device 400 further includes a power source 403. Power source 403 can be implemented as a portable power source, such as a battery or a source of near constant power coupled to the alternating current (AC) power grid.

Network device 400 further includes adjustable resolution phase shifter(s) 405 and multi-element antenna array 404. Adjustable resolution phase shifter(s) 405 may comprise one or more phase shifters that are capable of higher resolution functionality (e.g., B≥5-bit) but that may selectively reduce, by network device 400, the operational state to a lower resolution (e.g., B≤3-bit). Multi-element antenna array 404 includes a number of antenna elements arranged into an antenna array. As with adjustable resolution phase shifter(s) 405, network device 400 may perform transmission or reception using the full array of multi-element antenna array 404, but may also select to use a subset of antenna element for transmission or reception. For example, the full array of multi-element antenna array 404 may comprise an 8×8 array, 4×4 array, 8×4 array, 4×2 array, etc., while network device 400 may elect to reduce the effective antenna array for transmissions or receptions. For example, while multi-element antenna array 404 may be an 8×4 array, network device 400 may elect to transmit or receive with a subset of 4×4 array or 8×2 array or 4×2 array, or any other such subset combination.

Network device 400 further includes phase shifter/amplitude control adjustment logic 406, stored in memory 402. The execution, by controller 401, of the code and instructions of phase shifter/amplitude control adjustment logic 406 (referred to as the "execution environment" of phase shifter/amplitude control adjustment logic 406), enables the features and functionality of network device 400 for one or more aspects of the present disclosure to provide use of minimum EIRP constraints with lower precision phase shifters and/or amplitude control. Within the execution environment of phase shifter/amplitude control adjustment logic 406, network device 400 may adjust the resolution (the number of bits used for representing phase) of adjustable resolution phase shifter(s) 405 and/or the resolution (again, the number of bits used for representing the amplitude level) of the amplitude control during operation.

When network device 400 is implemented as a UE, such adjustment operations may be triggered by UE implementation (e.g., power savings). This operation can be combined with changes in the number of antenna elements and/or any other power saving operations the UE may have. For example, if power source 403 is a battery for the UE implementation of network device 400 and network device 400 detects a low battery state, it may trigger the adjustment either or both for the lower resolution of adjustable resolution phase shifter(s) 405, a reduction of antenna array elements for transmission or reception (e.g., reducing a 4×2 antenna array to a subset of a 2×2 antenna array), and/or reduce the resolution of the amplitude control.

It should be noted that such operations to adjust the resolution of adjustable resolution phase shifter(s) 405 or the amplitude control may alternatively be linked to a certain procedure that a UE may perform. For example, during a wake-up signal detection procedure, the UE implemented network device 400 may enable the adjustment operations. In an additional example, when the UE implemented network device 400 will perform a cell search, UE implemented network device 400 may also enable the adjustment operations.

Figure 5:
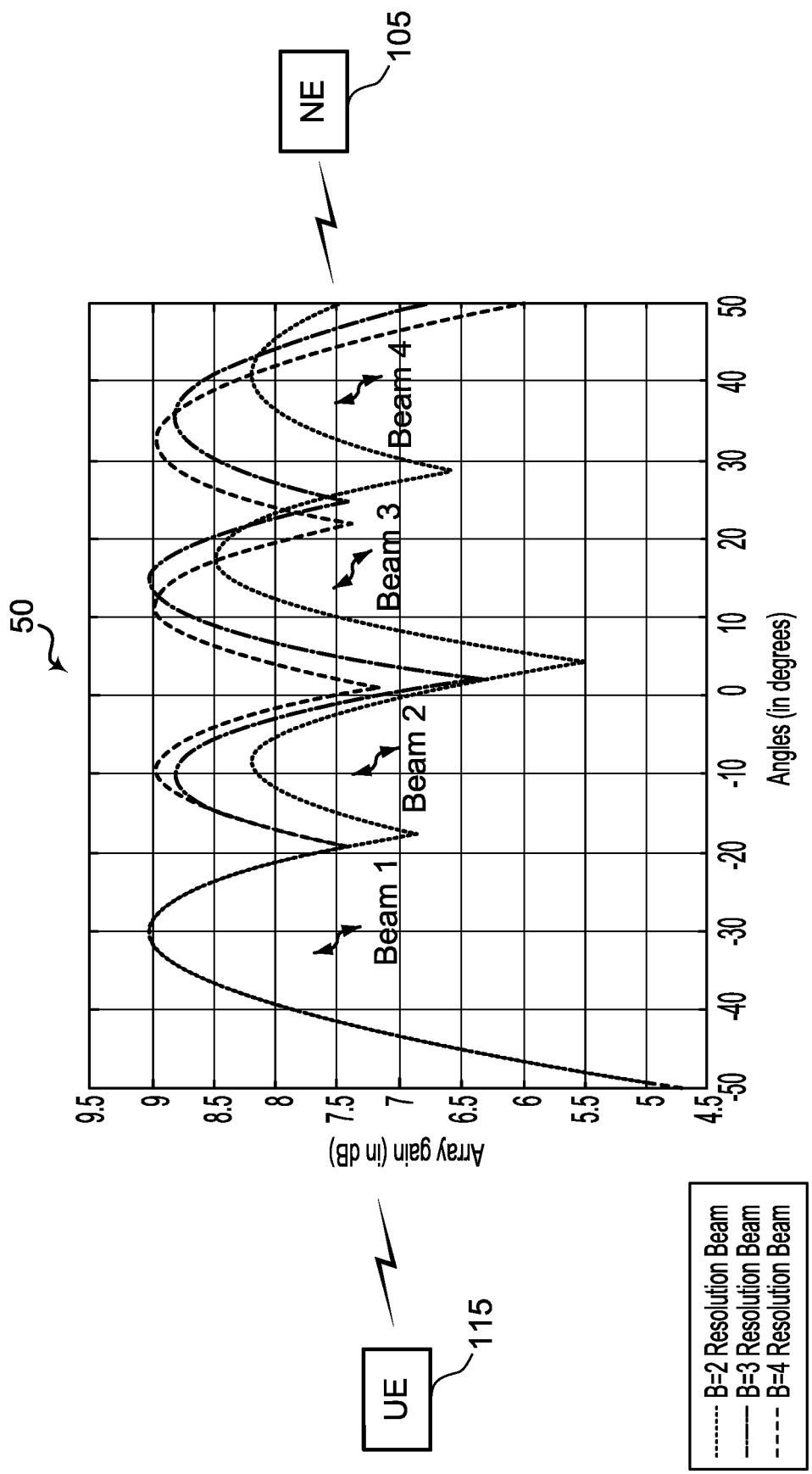
FIG. 5 is a block diagram illustrating a wireless network including a UE and network entity, each configured to dynamically adjust the resolution of phase shifters and/or amplitude controls level of the UE or network entity, respectively.

FIG. 5 is a block diagram illustrating wireless network 50 including UE 115 and network entity 105, each configured to dynamically adjust the resolution of phase shifters and/or amplitude controls level of UE 115 or network entity 105, respectively. Changes to the resolution of phase shifter(s) and/or amplitude control levels have a network level bearing because they impact the main lobe gain (peak gain), steering angles, side lobe gains, etc. As illustrated, UE 115 uses a 4×2 antenna array for which a beam codebook of size-4 is designed to cover +/−45° in azimuth. Four beams (beams 1-4) steer energy towards uniformly partitioned angles in the +/−45° coverage region. FIG. 5 illustrates a peak array gain for each the four beams transmitted by UE 115 to network entity 105 as transmitted at different phase shifter resolutions (e.g., B=2 resolution beam, B=3 resolution beam, and B=4 resolution beam). The B=4 resolution beam represents the four beams (beams 1-4) transmitted at a higher resolutions (B=4-bit), the B=3 resolution beam represents the four beams transmitted at a lower resolution (B=3-bit), and the B=2 resolution beam represents the four beams transmitted at an even lower resolution (B=2-bit).

As illustrated each of the resolutions for beam 1 reflects a peak array gain of 9 dB at −30°. For beam 2, the peak array gain is different for each of the three separate resolution phase shifters and the peak occurs at slightly different angles. The B=4 resolution beam 2 (B=4-bit) reflects a peak array gain of 9 dB at −9°, the B=3 resolution beam 2 (B=3-bit) reflects a peak array gain of approximately 8.8 dB at approximately −10°, and the B=2 resolution beam 2 (B=2-bit) reflects a peak array gain of approximately 8.1 dB at approximately −8°. The B=4 resolution beam 3 reflects a peak array gain of 9 dB at approximately 10°, the B=3 resolution beam 3 reflects a peak array gain of just over 9 dB at approximately 15°, and the B=2 resolution beam 3 reflects a peak array gain of 8.5 dB at approximately 19°. The B=4 resolution beam 4 reflects a peak array gain of 9 dB at approximately 33°, the B=3 resolution beam 4 reflects a peak array gain of 8.8 dB at approximately 35°, and the B=2 resolution beam 4 reflects a peak array gain of 8.3 dB at approximately 39°. While the peak array gains for beam 1 with different phase resolutions coincides with angle and gain, different phase resolution with beams 2-4 resulted in different angles and gains of peak array gain.

Another parameter to consider in the transmissions at different resolutions is the side lobe delta. Side lobe delta measures the gap between the main lobe of the transmission beam and the side lobe of the transmission within +/−90° azimuth. While not shown, the side lobe delta of beam 1 for each resolution (B=2 resolution beam, B=3 resolution beam, and B=4 resolution beam) coincides as approximately 11.3 dB, while the side lobe delta for beam 2 results in approximately 10.2 dB (B=4 resolution beam), 9 dB (B=3 resolution beam), and 6.5 dB (B=2 resolution beam), the side lobe delta for beam 3 results in approximately 9.6 dB (B=4 resolution beam), 11.4 dB (B=3 resolution beam), and 5 dB (B=2 resolution beam), and the side lobe delta for beam 4 results in approximately 10.2 dB (B=4 resolution beam), 9 dB (B=3 resolution beam), and 6.7 dB (B=2 resolution beam). Thus, wide changes may occur in network level measurements for transmissions using different phase shifter resolutions.

Figure 6:
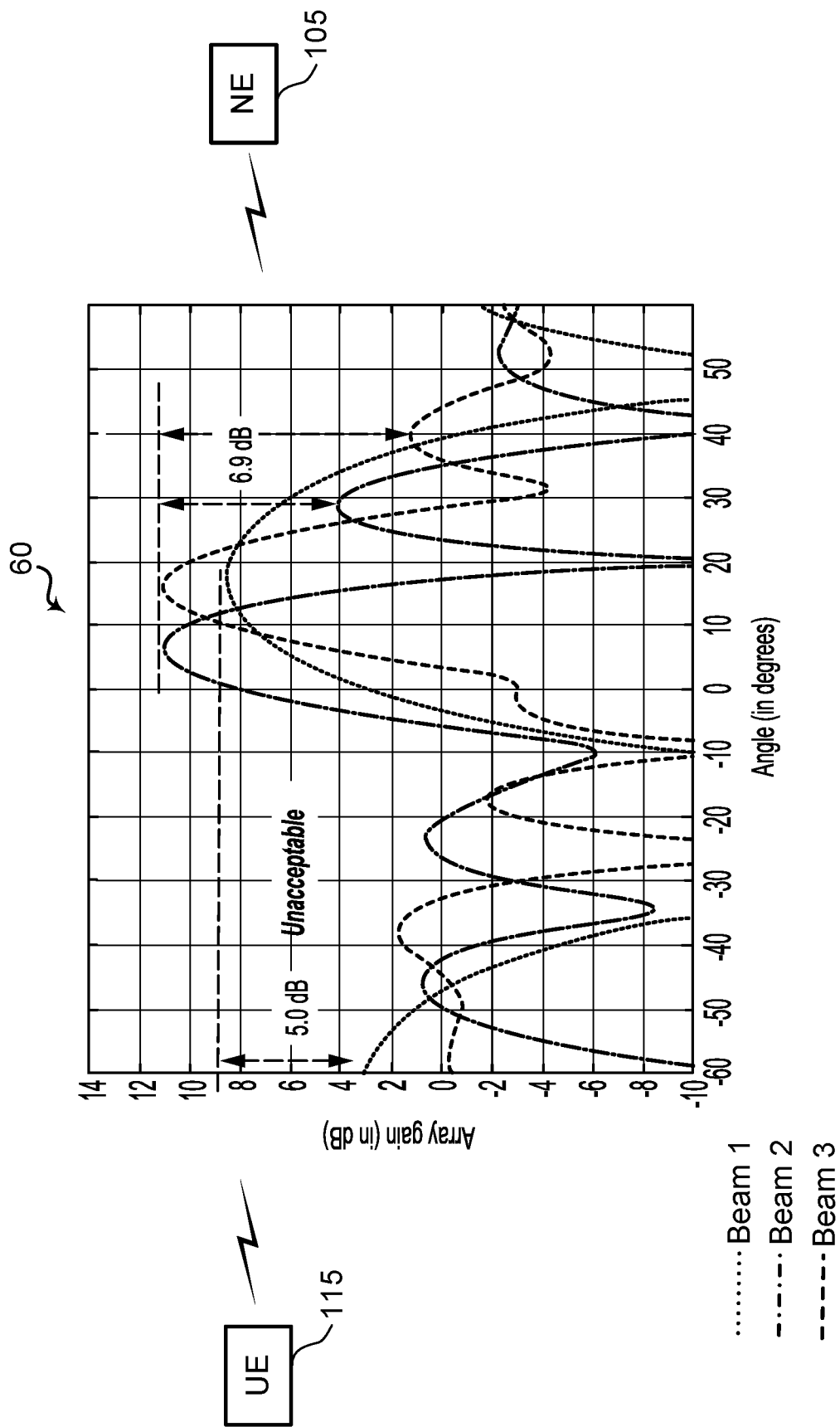
FIG. 6 is a block diagram illustrating a wireless network including a UE and network entity, each configured to dynamically adjust the resolution of phase shifters and/or amplitude controls level of a UE or network entity, respectively.

FIG. 6 is a block diagram illustrating wireless network 60 including UE 115 and network entity 105, each configured to dynamically adjust the resolution of phase shifters and/or amplitude controls level of UE 115 or network entity 105, respectively. The use of lower resolution phase shifter (B≤3-bit) may further have an effect on beam refinement. A transmission between UE 115 and network entity 105 may be made using a lower resolution phase shifter (B≤3-bit) but refined using a different antenna subarray. Considering the example illustrated in which the beam 1 is transmitted over a 4×2 antenna array. This beam 1 beam can be refined using two beams, beam 2 and 3, each using an 8×2 antenna array. In measuring the peak array gain of the beam 1, it has a main lobe peak array gain of 8.5 dB and a side lobe peak array gain resulting in a delta of 5.0 dB with the main lobe peak array gain. This 5.0 dB is not acceptable in many practical deployments, as it would provide considerable interference to the other UEs in the network. The beam 2 has a main lobe peak array gain of 11.0 dB and a side lobe peak array gain resulting in a delta of 6.9 dB, which, again would not be acceptable because it is too low to avoid the interference. Similarly, the beam 3 has a main lobe peak array gain of 11.0 dB and a side lobe peak array gain resulting in a delta of 9.3 dB, which, again, while better, would be considered too low to avoid the interference.

A delta of approximately 13.2 dB is seen between the main and side lobes in the asymptotics of antenna array dimensions as related to limiting behavior (e.g., as the dimensions of antenna arrays become larger and larger). This theory also holds true for a given/fixed array dimension with increased phase shifter and amplitude control. In general, as lower precision phase shifter(s) and/or amplitude control are used, the side lobes can deviate significantly from the theory. Similarly, the main lobe peak array gain can also deviate significantly from theory using the lower precision phase shifters and/or amplitude control.

Figure 7:
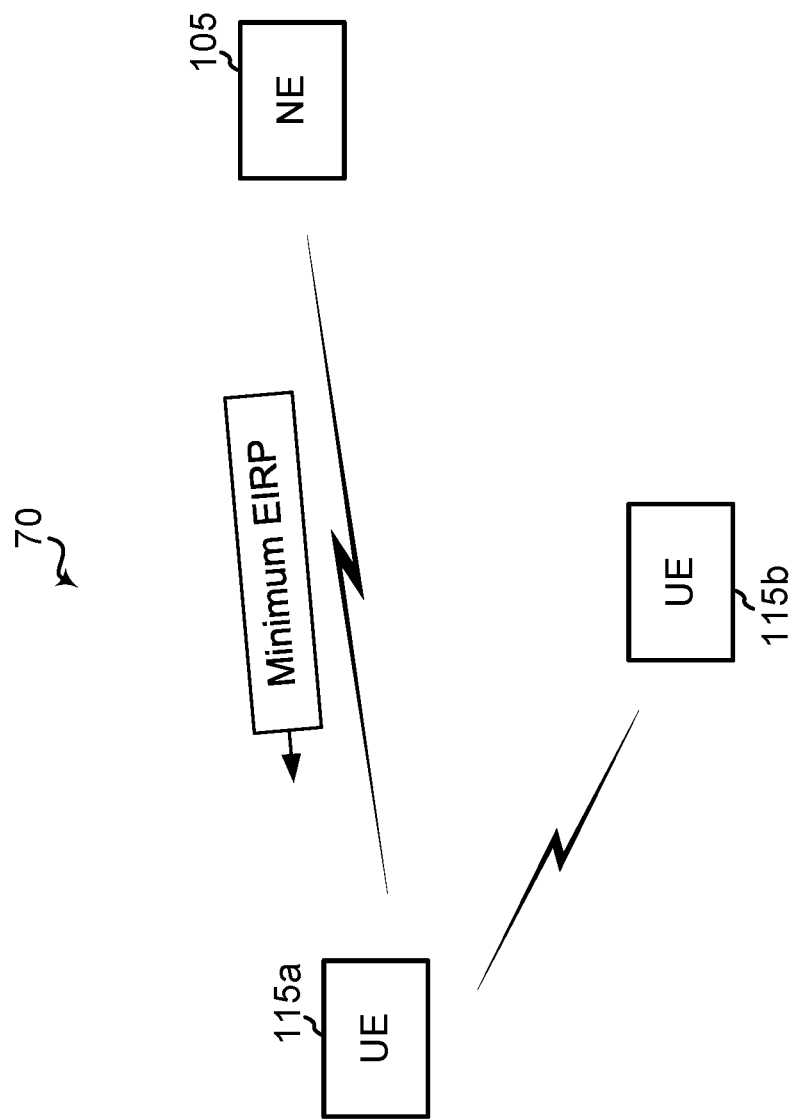
FIG. 7 is a block diagram illustrating a wireless network including UEs and a network entity, each configured to dynamically adjust the resolution of phase shifters and/or amplitude controls level according to one or more aspects.

FIG. 7 is a block diagram illustrating a wireless network 70 including UEs 115a and 115b and a network entity 105, each configured to dynamically adjust the resolution of phase shifters and/or amplitude controls level and provide use of minimum EIRP constraints with lower precision phase shifters and/or amplitude control according to one or more aspects. In the illustrated example of wireless network 70, UE 115a is in communication with network entity 105. As noted above, use of lower precision phase shifter(s) and/or amplitude control may cause the side lobes to deviate significantly from the minimum delta peak array gain in relation to the main lobe of the transmission. Additionally, a UE, such as UE 115a, may additionally adjust an array size for transmission to meet certain transmission characteristics, achieve certain power savings, and the like. However, as the array size becomes smaller, not only may peak array gain fall, but the gain of the side lobes may also deviate from the minimum delta peak array gain in relation to the main lobe (with the lower peak array gain). One antenna measurement that involves transmission power levels is effective isotropic radiated power (EIRP). EIRP is an equivalent effective isotropic radiated power defined as a power that would have to be radiated by a hypothetical isotropic antenna to achieve identical signal level in the direction of maximum radiation of a specific antenna. 5G antenna arrays, especially in the millimeter and higher bandwidths, use directional beams. EIRP is an equivalent of the power that would have to be radiated in an isotropic antenna to achieve that directional maximum radiation.

According to the various aspect described herein a UE, such as UE 115a, that uses lower resolution phase shifter(s) and/or amplitude control may use a minimum EIRP to limit reduction of antenna array size, so as not to result in transmissions where the side lobes do not meet the minimum delta peak array gain in relation to the main lobe. In one example aspect, network entity 105 determines the minimum EIRP that a served UE, such as UE 115a, should consider in setting the antenna array size for uplink transmissions to meet the acceptable network performance related to the minimum delta peak array between main and side lobes of a given uplink transmission.

Network entity 105 determines the minimum EIRP and transmits this value to UE 115a. The minimum EIRP constraint implicitly ensures that UE 115a uses a larger antenna array which loosens the impact of lower precision phase shifter(s) and/or amplitude control. This metric is comparable to the constraint of avoiding certain UE-side beams without actually explicitly declining their usage.

In the illustrated example of wireless network 70, UE 115a is in communication with network entity 105. UE 115b may also be in communication with network entity 105 and/or may be in communication with UE 115a via a sidelink interface, such as PC5 or a Uu interface configured for sidelink communications. In another optional example aspect, as UE 115a adjusts the resolutions of its phase shifter(s) and/or amplitude control levels, UE 115a calculates the changes in peak array gain for the serving UE-side beam (that is, the main lobe of the directional beam from UE 115a serving network entity 105). UE 115a communicates information identifying these changes in peak array gain associated with the changes to resolution of the phase shifter(s) and/or amplitude control levels. This information would allow network entity 105 to increase transmit power, via power control operations, to maintain same link budget, if necessary.

In another optional example aspect illustrated in FIG. 7, in addition to calculating changes to peak array gain for the main lobe of the serving UE-side beam, UE 115a may also calculate changes in the peak array gain for the first side lobe level associated with the changes in resolution of the phase shifter(s) and/or amplitude control levels. UE 115a may then communicate information reflecting the changes in peak array gain of the first side lobes as well as the corresponding direction information for the serving UE-side beam associated with the resolution changes of the phase shifter(s) and/or amplitude control level. Such information allows network entity 105 to communicate to UE 115a that it may see increased interference levels as UE 115a performs uplink transmissions.

In another optional example aspect illustrated in FIG. 7, as UE 115a adjusts the resolution of phase shifter(s) and/or amplitude control levels, UE 115a may detect and identify directional changes of the transmission beam steering associated with the change in resolution. Where the direction change significantly deviates from the original direction of the higher resolution phase shifter(s) and/or amplitude control levels, UE 115a may additionally communicate a message to network entity 105 that identifies a relevant beam switch to a different serving UE-side beam, in which the newly selected beam more closely matches the original direction of the higher resolution phase shifter(s) and/or amplitude control.

In another optional example aspect illustrated in FIG. 7, UE 115a and UE 115b, in sidelink communication, may cooperate in power savings, where one device has a higher battery level and the other has a lower battery level that triggers power savings operations. In one example implementation, UE 115b, which has a lower battery level that triggers power saving operations, signals UE 115a that is will reduce the resolution of its phase shifter(s) and/or amplitude control levels in its transmissions. UE 115a has a higher battery level. Upon receiving the signaling from UE 115b, UE 115a may increase the resolution of its phase shifter(s) and/or amplitude control levels which may maintain the same link budget while allowing UE 115b to implement power savings measures. This approach allows two nodes in a link to maintain the same link budget, but by sharing the resolution burden to the node/device that can afford a higher power consumption.

It is noted that one or more blocks (or operations) described with reference to FIG. 3 may be combined with one or more blocks (or operations) described with reference to another of the figures. For example, one or more blocks (or operations) of FIG. 3 may be combined with one or more blocks (or operations) of FIG. 7. Additionally, or alternatively, one or more operations described above with reference to FIGS. 1-2 may be combined with one or more operations described with reference to FIG. 8.

In one or more aspects, techniques for supporting dynamic adjustment of the resolution of phase shifters and/or amplitude controls level and use of minimum EIRP constraints with lower precision phase shifters and/or amplitude control may include additional aspects, such as any single aspect or any combination of aspects described below or in connection with one or more other processes or devices described elsewhere herein. In a first aspect, supporting dynamic adjustment of the resolution of phase shifters and/or amplitude controls level and use of minimum EIRP constraints with lower precision phase shifters and/or amplitude control, a UE may be configured to obtain one or more system performance parameters from a serving network entity, wherein the one or more system performance parameters includes a minimum EIRP for uplink transmissions, to calculate an estimated EIRP for one or more candidate uplink transmission configurations of the UE, to select an uplink transmission configuration of the one or more candidate uplink transmission configuration in response to the estimated EIRP corresponding to the uplink transmission configuration meeting the minimum EIRP, and to send the uplink transmissions according to the uplink transmission configuration.

Additionally, the UE may perform or operate according to one or more aspects as described below. In some implementations, the UE includes a wireless device, such as a IoT device or the like. In some implementations, the UE may include at least one processor, and a memory coupled to the processor. The processor may be configured to perform operations described herein with respect to the UE. In some other implementations, the UE may include a non-transitory computer-readable medium having program code recorded thereon and the program code may be executable by a computer for causing the computer to perform operations described herein with reference to the apparatus. In some implementations, the UE may include one or more means configured to perform operations described herein. In some implementations, a method of wireless communication may include one or more operations described herein with reference to the UE.

In a second aspect, alone or in combination with the first aspect, further including configuration of the at least one processor: to identify a condition to dynamically adjust a phase shifting resolution, an amplitude control, or a combination thereof; and to adjust the phase shifting resolution, the amplitude control, or the combination thereof in response to the condition, wherein the configuration of the at least one processor to calculate the estimated EIRP and to select the uplink transmission configuration is performed using an adjusted phase shifting resolution, an adjusted amplitude control, or an adjusted combination thereof resulting from execution of the configuration of the at least one processor to adjust.

In a third aspect, alone or in combination with one or more of the first aspect or the second aspect, wherein the condition includes: a power management condition; or an operation predetermined to correspond to the condition.

In a fourth aspect, alone or in combination with one or more of the first aspect through the third aspect, further including configuration of the at least one processor to measure an adjusted peak array gain of a serving UE-side beam in response to execution of the configuration of the at least one processor to adjust; and to report, to the serving network entity, a peak array gain difference between the adjusted peak array gain and a prior peak array gain of the serving UE-side beam prior to execution of the configuration of the at least one processor to adjust.

In a fifth aspect, alone or in combination with one or more of the first aspect through the fourth aspect, further including, in response to the configuration of the at least one processor to adjust, configuration of the at least one processor to measure an adjusted main lobe gain and an adjusted main lobe direction of a main lobe of a serving UE-side beam; to measure an adjusted first side lobe gain and an adjusted first side lobe direction of a first side lobe of the serving UE-side beam; and to report, to the serving network entity, one or more of: a main lobe gain difference between the adjusted main lobe gain and a prior main lobe gain of the serving UE-side beam prior to execution of the configuration of the at least one processor adjust; a main lobe direction change between the adjusted main lobe direction and a prior main lobe direction of the serving UE-side beam prior to execution of the configuration of the at least one processor adjust; a first side lobe gain difference between the adjusted first side lobe gain and a prior first side lobe gain of the serving UE-side beam prior to execution of the configuration of the at least one processor adjust; and a first side lobe direction change between the adjusted first side lobe gain and a prior first side lobe direction of the serving UE-side beam prior to execution of the configuration of the at least one processor adjust.

In a sixth aspect, alone or in combination with one or more of the first aspect through the fifth aspect, further including configuration of the at least one processor to determine the main lobe direction change exceeds a predefined threshold value; to identify a new serving UE-side beam corresponding to the adjusted phase shifting resolution, the adjusted amplitude control, or the adjusted combination thereof resulting from execution of the configuration of the at least one processor to adjust, wherein a new main lobe direction of the new serving UE-side beam lies within a predefined threshold range of the prior main lobe direction of the serving UE-side beam prior to execution of the configuration of the at least one processor adjust; and to report, to the serving network entity, the new serving UE-side beam.

In a seventh aspect, alone or in combination with one or more of the first aspect through the sixth aspect, wherein the configuration of the at least one processor to send the uplink transmissions includes configuration of the at least one processor to send the uplink transmissions via a sidelink transmission interface to a neighboring UE, the UE further including configuration of the at least one processor to receive from the neighboring UE an indication of dynamic phase shifting resolution or amplitude control adjustment capability; and to receive from the neighboring UE a low battery indicator, wherein the configuration of the at least one processor to identify the condition includes configuration of the at least one processor to identify the condition of the low battery indicator of the neighboring UE with the indication of dynamic phase shifting resolution or amplitude control adjustment capability, and wherein the configuration of the at least one processor to adjust includes configuration of the at least one processor to increase the phase shifting resolution, the amplitude control, or the combination thereof.

In an eighth aspect, alone or in combination with one or more of the first aspect through the seventh aspect, wherein the configuration of the at least one processor to send the uplink transmissions includes configuration of the at least one processor to send the uplink transmissions via a sidelink transmission interface to a neighboring UE, the UE further including configuration of the at least one processor to transmit to the neighboring UE an indication of dynamic phase shifting resolution or amplitude control adjustment capability; to identify a low battery condition at the UE, wherein the configuration of the at least one processor to identify the condition includes configuration of the at least one processor to identify the low battery condition at the UE, and wherein the configuration of the at least one processor to adjust includes configuration of the at least one processor to decrease the phase shifting resolution, the amplitude control, or the combination thereof; and to transmit to the neighboring UE a low battery indicator.

A ninth aspect for wireless communication performed by a UE may include obtaining one or more system performance parameters from a serving network entity, wherein the one or more system performance parameters includes a minimum EIRP for uplink transmissions; calculating an estimated EIRP for one or more candidate uplink transmission configurations of the UE; selecting an uplink transmission configuration of the one or more candidate uplink transmission configuration in response to the estimated EIRP corresponding to the uplink transmission configuration meeting the minimum EIRP; and sending the uplink transmissions according to the uplink transmission configuration.

In a tenth aspect, alone or in combination with the ninth aspect, further including: identifying a condition to dynamically adjust a phase shifting resolution, an amplitude control, or a combination thereof; and adjusting the phase shifting resolution, the amplitude control, or the combination thereof in response to the condition, wherein the calculating the estimated EIRP and selecting the uplink transmission configuration is performed using an adjusted phase shifting resolution, an adjusted amplitude control, or an adjusted combination thereof resulting from the adjusting.

In an eleventh aspect, alone or in combination with one or more of the ninth aspect or the tenth aspect, wherein the condition includes: a power management condition; or an operation predetermined to correspond to the condition.

In a twelfth aspect, alone or in combination with one or more of the ninth aspect through the eleventh aspect, further including: measuring an adjusted peak array gain of a serving UE-side beam in response to the adjusting; and reporting, to the serving network entity, a peak array gain difference between the adjusted peak array gain and a prior peak array gain of the serving UE-side beam prior to the adjusting.

In a thirteenth aspect, alone or in combination with one or more of the ninth aspect through the twelfth aspect, further including, in response to the adjusting: measuring an adjusted main lobe gain and an adjusted main lobe direction of a main lobe of a serving UE-side beam; measuring an adjusted first side lobe gain and an adjusted first side lobe direction of a first side lobe of the serving UE-side beam; and reporting, to the serving network entity, one or more of: a main lobe gain difference between the adjusted main lobe gain and a prior main lobe gain of the serving UE-side beam prior to the adjusting; a main lobe direction change between the adjusted main lobe direction and a prior main lobe direction of the serving UE-side beam prior to the adjusting; a first side lobe gain difference between the adjusted first side lobe gain and a prior first side lobe gain of the serving UE-side beam prior to the adjusting; and a first side lobe direction change between the adjusted first side lobe gain and a prior first side lobe direction of the serving UE-side beam prior to the adjusting.

In a fourteenth aspect, alone or in combination with one or more of the ninth aspect through the thirteenth aspect, further including: determining the main lobe direction change exceeds a predefined threshold value; identifying a new serving UE-side beam corresponding to the adjusted phase shifting resolution, the adjusted amplitude control, or the adjusted combination thereof resulting from the adjusting, wherein a new main lobe direction of the new serving UE-side beam lies within a predefined threshold range of the prior main lobe direction of the serving UE-side beam prior to the adjusting; and reporting, to the serving network entity, the new serving UE-side beam.

In a fifteenth aspect, alone or in combination with one or more of the ninth aspect through the fourteenth aspect, wherein the sending the uplink transmissions includes sending the uplink transmissions via a sidelink transmission interface to a neighboring UE, the method further including: receiving from the neighboring UE an indication of dynamic phase shifting resolution or amplitude control adjustment capability; and receiving from the neighboring UE a low battery indicator, wherein the identifying the condition includes identifying the condition of the low battery indicator of the neighboring UE with the indication of dynamic phase shifting resolution or amplitude control adjustment capability, and wherein the adjusting includes increasing the phase shifting resolution, the amplitude control, or the combination thereof.

In a sixteenth aspect, alone or in combination with one or more of the ninth aspect through the fifteenth aspect, wherein the sending the uplink transmissions includes sending the uplink transmissions via a sidelink transmission interface to a neighboring UE, the method further including: transmitting to the neighboring UE an indication of dynamic phase shifting resolution or amplitude control adjustment capability; identifying a low battery condition at the UE, wherein the identifying the condition includes identifying the low battery condition at the UE, and wherein the adjusting includes decreasing the phase shifting resolution, the amplitude control, or the combination thereof; and transmitting to the neighboring UE a low battery indicator.

A seventeenth aspect configured for wireless communication, comprising: means for obtaining one or more system performance parameters from a serving network entity, wherein the one or more system performance parameters includes a minimum EIRP for uplink transmissions; means for calculating an estimated EIRP for one or more candidate uplink transmission configurations of the UE; means for selecting an uplink transmission configuration of the one or more candidate uplink transmission configuration in response to the estimated EIRP corresponding to the uplink transmission configuration meeting the minimum EIRP; and means for sending the uplink transmissions according to the uplink transmission configuration.

In an eighteenth aspect, alone or in combination with the seventeenth aspect, further including: means for identifying a condition to dynamically adjust a phase shifting resolution, an amplitude control, or a combination thereof; and means for adjusting the phase shifting resolution, the amplitude control, or the combination thereof in response to the condition, wherein the means for calculating the estimated EIRP and the means for selecting the uplink transmission configuration is performed using an adjusted phase shifting resolution, an adjusted amplitude control, or an adjusted combination thereof resulting from the means for adjusting.

In a nineteenth aspect, alone or in combination with one or more of the seventeenth aspect or the eighteenth aspect, wherein the condition includes: a power management condition; or an operation predetermined to correspond to the condition.

In a twentieth aspect, alone or in combination with one or more of the seventeenth aspect through the nineteenth aspect, further including: means for measuring an adjusted peak array gain of a serving UE-side beam in response to execution of the means for adjusting; and means for reporting, to the serving network entity, a peak array gain difference between the adjusted peak array gain and a prior peak array gain of the serving UE-side beam prior to execution of the means for adjusting.

In a twenty-first aspect, alone or in combination with one or more of the seventeenth aspect through the twentieth aspect, further including, in response to execution of the means for adjusting: means for measuring an adjusted main lobe gain and an adjusted main lobe direction of a main lobe of a serving UE-side beam; means for measuring an adjusted first side lobe gain and an adjusted first side lobe direction of a first side lobe of the serving UE-side beam; and means for reporting, to the serving network entity, one or more of: a main lobe gain difference between the adjusted main lobe gain and a prior main lobe gain of the serving UE-side beam prior to execution of the means for adjusting; a main lobe direction change between the adjusted main lobe direction and a prior main lobe direction of the serving UE-side beam prior to execution of the means for adjusting; a first side lobe gain difference between the adjusted first side lobe gain and a prior first side lobe gain of the serving UE-side beam prior to execution of the means for adjusting; and a first side lobe direction change between the adjusted first side lobe gain and a prior first side lobe direction of the serving UE-side beam prior to execution of the means for adjusting.

In a twenty-second aspect, alone or in combination with one or more of the seventeenth aspect through the twenty-first aspect, further including: means for determining the main lobe direction change exceeds a predefined threshold value; means for identifying a new serving UE-side beam corresponding to the adjusted phase shifting resolution, the adjusted amplitude control, or the adjusted combination thereof resulting from the means for adjusting, wherein a new main lobe direction of the new serving UE-side beam lies within a predefined threshold range of the prior main lobe direction of the serving UE-side beam prior to execution of the means for adjusting; and means for reporting, to the serving network entity, the new serving UE-side beam.

In a twenty-third aspect, alone or in combination with one or more of the seventeenth aspect through the twenty-second aspect, wherein the means for sending the uplink transmissions includes means for sending the uplink transmissions via a sidelink transmission interface to a neighboring UE, the UE further including: means for receiving from the neighboring UE an indication of dynamic phase shifting resolution or amplitude control adjustment capability; and means for receiving from the neighboring UE a low battery indicator, wherein the means for identifying the condition includes means for identifying the condition of the low battery indicator of the neighboring UE with the indication of dynamic phase shifting resolution or amplitude control adjustment capability, and wherein the means for adjusting includes means for increasing the phase shifting resolution, the amplitude control, or the combination thereof.

In a twenty-fourth aspect, alone or in combination with one or more of the seventeenth aspect through the twenty-third aspect, wherein the means for sending the uplink transmissions includes means for sending the uplink transmissions via a sidelink transmission interface to a neighboring UE, the UE further including: means for transmitting to the neighboring UE an indication of dynamic phase shifting resolution or amplitude control adjustment capability; means for identifying a low battery condition at the UE, wherein the means for identifying the condition includes means for identifying the low battery condition at the UE, and wherein the means for adjusting includes means for decreasing the phase shifting resolution, the amplitude control, or the combination thereof; and means for transmitting to the neighboring UE a low battery indicator.

A twenty-fifth aspect includes a non-transitory computer-readable medium having program code recorded thereon. The program code comprising program code executable by a computer for causing the computer to obtain one or more system performance parameters from a serving network entity, wherein the one or more system performance parameters includes a minimum EIRP for uplink transmissions; calculate an estimated EIRP for one or more candidate uplink transmission configurations of the UE; select an uplink transmission configuration of the one or more candidate uplink transmission configuration in response to the estimated EIRP corresponding to the uplink transmission configuration meeting the minimum EIRP; and send the uplink transmissions according to the uplink transmission configuration.

In a twenty-sixth aspect, alone or in combination with the twenty-fifth aspect, further including program code executable by the computer for causing the computer to identify a condition to dynamically adjust a phase shifting resolution, an amplitude control, or a combination thereof; and to adjust the phase shifting resolution, the amplitude control, or the combination thereof in response to the condition, wherein the program code executable by the computer for causing the computer to calculate the estimated EIRP and to select the uplink transmission configuration is performed using an adjusted phase shifting resolution, an adjusted amplitude control, or an adjusted combination thereof resulting from execution of the program code executable by the computer for causing the computer to adjust.

In a twenty-seventh aspect, alone or in combination with one or more of the twenty-fifth aspect or the twenty-sixth aspect, wherein the condition includes: a power management condition; or an operation predetermined to correspond to the condition.

In a twenty-eighth aspect, alone or in combination with one or more of the twenty-fifth aspect through the twenty-seventh aspect, further including program code executable by the computer for causing the computer to measure an adjusted peak array gain of a serving UE-side beam in response to execution of the program code executable the computer for causing the computer to adjust; and to report, to the serving network entity, a peak array gain difference between the adjusted peak array gain and a prior peak array gain of the serving UE-side beam prior to execution of the program code executable by the computer for causing the computer to adjust.

In a twenty-ninth aspect, alone or in combination with one or more of the twenty-fifth aspect through the twenty-eighth aspect, further including execution, in response to the program code executable by the computer for causing the computer to adjust, of program code executable by the computer for causing the computer to measure an adjusted main lobe gain and an adjusted main lobe direction of a main lobe of a serving UE-side beam; to measure an adjusted first side lobe gain and an adjusted first side lobe direction of a first side lobe of the serving UE-side beam; and to report, to the serving network entity, one or more of: a main lobe gain difference between the adjusted main lobe gain and a prior main lobe gain of the serving UE-side beam prior to execution of the program code executable by the computer for causing the computer to adjust; a main lobe direction change between the adjusted main lobe direction and a prior main lobe direction of the serving UE-side beam prior to execution of the program code executable by the computer for causing the computer to adjust; a first side lobe gain difference between the adjusted first side lobe gain and a prior first side lobe gain of the serving UE-side beam prior to execution of the program code executable by the computer for causing the computer to adjust; and a first side lobe direction change between the adjusted first side lobe gain and a prior first side lobe direction of the serving UE-side beam prior to execution of the program code executable by the computer for causing the computer to adjust.

In a thirtieth aspect, alone or in combination with one or more of the twenty-fifth aspect through the twenty-ninth aspect, further including program code executable by the computer for causing the computer to determine the main lobe direction change exceeds a predefined threshold value; to identify a new serving UE-side beam corresponding to the adjusted phase shifting resolution, the adjusted amplitude control, or the adjusted combination thereof resulting from execution of the program code executable by the computer for causing the computer to adjust, wherein a new main lobe direction of the new serving UE-side beam lies within a predefined threshold range of the prior main lobe direction of the serving UE-side beam prior to execution of the program code executable by the computer for causing the computer to adjust; and to report, to the serving network entity, the new serving UE-side beam.

In a thirty-first aspect, alone or in combination with one or more of the twenty-fifth aspect through the thirtieth aspect, wherein the program code executable by the computer for causing the computer to send the uplink transmissions includes program code executable by the computer for causing the computer to send the uplink transmissions via a sidelink transmission interface to a neighboring UE, the UE further including program code executable by the computer for causing the computer to receive from the neighboring UE an indication of dynamic phase shifting resolution or amplitude control adjustment capability; and to receive from the neighboring UE a low battery indicator, wherein the program code executable by the computer for causing the computer to identify the condition includes program code executable by the computer for causing the computer to identify the condition of the low battery indicator of the neighboring UE with the indication of dynamic phase shifting resolution or amplitude control adjustment capability, and wherein the program code executable by the computer for causing the computer to adjust includes program code executable by the computer for causing the computer to increase the phase shifting resolution, the amplitude control, or the combination thereof.

In a thirty-second aspect, alone or in combination with one or more of the twenty-fifth aspect through the thirty-first aspect, wherein the program code executable by the computer for causing the computer to send the uplink transmissions includes program code executable by the computer for causing the computer to send the uplink transmissions via a sidelink transmission interface to a neighboring UE, the UE further including program code executable by the computer for causing the computer to transmit to the neighboring UE an indication of dynamic phase shifting resolution or amplitude control adjustment capability; to identify a low battery condition at the UE, wherein the program code executable by the computer for causing the computer to identify the condition includes program code executable by the computer for causing the computer to identify the low battery condition at the UE, and wherein the program code executable by the computer for causing the computer to adjust includes program code executable by the computer for causing the computer to decrease the phase shifting resolution, the amplitude control, or the combination thereof; and to transmit to the neighboring UE a low battery indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) configured for wireless communication, the UE comprising:
at least one processor; and
a memory coupled to the at least one processor,
wherein the at least one processor is configured:
to obtain one or more system performance parameters from a serving network entity, wherein the one or more system performance parameters includes a minimum effective isotropic radiated power (EIRP) for uplink transmissions;
to calculate an estimated EIRP for one or more candidate uplink transmission configurations of the UE;
to select an uplink transmission configuration of the one or more candidate uplink transmission configuration in response to the estimated EIRP corresponding to the uplink transmission configuration meeting the minimum EIRP; and
to send the uplink transmissions according to the uplink transmission configuration.

2. The UE of claim 1, further including configuration of the at least one processor:
to identify a condition to dynamically adjust a phase shifting resolution, an amplitude control, or a combination thereof; and
to adjust the phase shifting resolution, the amplitude control, or the combination thereof in response to the condition, wherein the configuration of the at least one processor to calculate the estimated EIRP and to select the uplink transmission configuration is performed using an adjusted phase shifting resolution, an adjusted amplitude control, or an adjusted combination thereof resulting from execution of the configuration of the at least one processor to adjust.

3. The UE of claim 2, wherein the condition includes:
a power management condition; or
an operation predetermined to correspond to the condition.

4. The UE of claim 2, further including configuration of the at least one processor:
to measure an adjusted peak array gain of a serving UE-side beam in response to execution of the configuration of the at least one processor to adjust; and
to report, to the serving network entity, a peak array gain difference between the adjusted peak array gain and a prior peak array gain of the serving UE-side beam prior to execution of the configuration of the at least one processor to adjust.

5. The UE of claim 2, further including, in response to the configuration of the at least one processor to adjust, configuration of the at least one processor:
to measure an adjusted main lobe gain and an adjusted main lobe direction of a main lobe of a serving UE-side beam;
to measure an adjusted first side lobe gain and an adjusted first side lobe direction of a first side lobe of the serving UE-side beam; and
to report, to the serving network entity, one or more of:
a main lobe gain difference between the adjusted main lobe gain and a prior main lobe gain of the serving UE-side beam prior to execution of the configuration of the at least one processor adjust;
a main lobe direction change between the adjusted main lobe direction and a prior main lobe direction of the serving UE-side beam prior to execution of the configuration of the at least one processor adjust;
a first side lobe gain difference between the adjusted first side lobe gain and a prior first side lobe gain of the serving UE-side beam prior to execution of the configuration of the at least one processor adjust; and
a first side lobe direction change between the adjusted first side lobe gain and a prior first side lobe direction of the serving UE-side beam prior to execution of the configuration of the at least one processor adjust.

6. The UE of claim 5, further including configuration of the at least one processor:
to determine the main lobe direction change exceeds a predefined threshold value;
to identify a new serving UE-side beam corresponding to the adjusted phase shifting resolution, the adjusted amplitude control, or the adjusted combination thereof resulting from execution of the configuration of the at least one processor to adjust, wherein a new main lobe direction of the new serving UE-side beam lies within a predefined threshold range of the prior main lobe direction of the serving UE-side beam prior to execution of the configuration of the at least one processor adjust; and
to report, to the serving network entity, the new serving UE-side beam.

7. The UE of claim 2, wherein the configuration of the at least one processor to send the uplink transmissions includes configuration of the at least one processor to send the uplink transmissions via a sidelink transmission interface to a neighboring UE, the UE further including configuration of the at least one processor:
to receive from the neighboring UE an indication of dynamic phase shifting resolution or amplitude control adjustment capability; and
to receive from the neighboring UE a low battery indicator,
wherein the configuration of the at least one processor to identify the condition includes configuration of the at least one processor to identify the condition of the low battery indicator of the neighboring UE with the indication of dynamic phase shifting resolution or amplitude control adjustment capability, and
wherein the configuration of the at least one processor to adjust includes configuration of the at least one processor to increase the phase shifting resolution, the amplitude control, or the combination thereof.

8. The UE of claim 2, wherein the configuration of the at least one processor to send the uplink transmissions includes configuration of the at least one processor to send the uplink transmissions via a sidelink transmission interface to a neighboring UE, the UE further including configuration of the at least one processor:
to transmit to the neighboring UE an indication of dynamic phase shifting resolution or amplitude control adjustment capability;
to identify a low battery condition at the UE,
wherein the configuration of the at least one processor to identify the condition includes configuration of the at least one processor to identify the low battery condition at the UE, and
wherein the configuration of the at least one processor to adjust includes configuration of the at least one processor to decrease the phase shifting resolution, the amplitude control, or the combination thereof; and to transmit to the neighboring UE a low battery indicator.

9. A method of wireless communication performed by a user equipment (UE), the method comprising:
obtaining one or more system performance parameters from a serving network entity, wherein the one or more system performance parameters includes a minimum effective isotropic radiated power (EIRP) for uplink transmissions;
calculating an estimated EIRP for one or more candidate uplink transmission configurations of the UE;
selecting an uplink transmission configuration of the one or more candidate uplink transmission configuration in response to the estimated EIRP corresponding to the uplink transmission configuration meeting the minimum EIRP; and
sending the uplink transmissions according to the uplink transmission configuration.

10. The method of claim 9, further including:
identifying a condition to dynamically adjust a phase shifting resolution, an amplitude control, or a combination thereof; and
adjusting the phase shifting resolution, the amplitude control, or the combination thereof in response to the condition, wherein the calculating the estimated EIRP and selecting the uplink transmission configuration is performed using an adjusted phase shifting resolution, an adjusted amplitude control, or an adjusted combination thereof resulting from the adjusting.

11. The method of claim 10, wherein the condition includes:
a power management condition; or
an operation predetermined to correspond to the condition.

12. The method of claim 10, further including:
measuring an adjusted peak array gain of a serving UE-side beam in response to the adjusting; and
reporting, to the serving network entity, a peak array gain difference between the adjusted peak array gain and a prior peak array gain of the serving UE-side beam prior to the adjusting.

13. The method of claim 10, further including, in response to the adjusting:
measuring an adjusted main lobe gain and an adjusted main lobe direction of a main lobe of a serving UE-side beam;
measuring an adjusted first side lobe gain and an adjusted first side lobe direction of a first side lobe of the serving UE-side beam; and
reporting, to the serving network entity, one or more of:
a main lobe gain difference between the adjusted main lobe gain and a prior main lobe gain of the serving UE-side beam prior to the adjusting;
a main lobe direction change between the adjusted main lobe direction and a prior main lobe direction of the serving UE-side beam prior to the adjusting;
a first side lobe gain difference between the adjusted first side lobe gain and a prior first side lobe gain of the serving UE-side beam prior to the adjusting; and
a first side lobe direction change between the adjusted first side lobe gain and a prior first side lobe direction of the serving UE-side beam prior to the adjusting.

14. The method of claim 13, further including:
determining the main lobe direction change exceeds a predefined threshold value;
identifying a new serving UE-side beam corresponding to the adjusted phase shifting resolution, the adjusted amplitude control, or the adjusted combination thereof resulting from the adjusting, wherein a new main lobe direction of the new serving UE-side beam lies within a predefined threshold range of the prior main lobe direction of the serving UE-side beam prior to the adjusting; and
reporting, to the serving network entity, the new serving UE-side beam.

15. The method of claim 10, wherein the sending the uplink transmissions includes sending the uplink transmissions via a sidelink transmission interface to a neighboring UE, the method further including:
receiving from the neighboring UE an indication of dynamic phase shifting resolution or amplitude control adjustment capability; and
receiving from the neighboring UE a low battery indicator,
wherein the identifying the condition includes identifying the condition of the low battery indicator of the neighboring UE with the indication of dynamic phase shifting resolution or amplitude control adjustment capability, and
wherein the adjusting includes increasing the phase shifting resolution, the amplitude control, or the combination thereof.

16. The method of claim 10, wherein the sending the uplink transmissions includes sending the uplink transmissions via a sidelink transmission interface to a neighboring UE, the method further including:
transmitting to the neighboring UE an indication of dynamic phase shifting resolution or amplitude control adjustment capability;
identifying a low battery condition at the UE,
wherein the identifying the condition includes identifying the low battery condition at the UE, and
wherein the adjusting includes decreasing the phase shifting resolution, the amplitude control, or the combination thereof; and
transmitting to the neighboring UE a low battery indicator.

17. A user equipment (UE) configured for wireless communication, comprising:
means for obtaining one or more system performance parameters from a serving network entity, wherein the one or more system performance parameters includes a minimum effective isotropic radiated power (EIRP) for uplink transmissions;
means for calculating an estimated EIRP for one or more candidate uplink transmission configurations of the UE;
means for selecting an uplink transmission configuration of the one or more candidate uplink transmission configuration in response to the estimated EIRP corresponding to the uplink transmission configuration meeting the minimum EIRP; and
means for sending the uplink transmissions according to the uplink transmission configuration.

18. The UE of claim 17, further including:
means for identifying a condition to dynamically adjust a phase shifting resolution, an amplitude control, or a combination thereof; and
means for adjusting the phase shifting resolution, the amplitude control, or the combination thereof in response to the condition, wherein the means for calculating the estimated EIRP and the means for selecting the uplink transmission configuration is performed using an adjusted phase shifting resolution, an adjusted amplitude control, or an adjusted combination thereof resulting from the means for adjusting.

19. The UE of claim 18, wherein the condition includes:
a power management condition; or
an operation predetermined to correspond to the condition.

20. The UE of claim 18, further including:
means for measuring an adjusted peak array gain of a serving UE-side beam in response to execution of the means for adjusting; and
means for reporting, to the serving network entity, a peak array gain difference between the adjusted peak array gain and a prior peak array gain of the serving UE-side beam prior to execution of the means for adjusting.

21. The UE of claim 18, further including, in response to execution of the means for adjusting:
means for measuring an adjusted main lobe gain and an adjusted main lobe direction of a main lobe of a serving UE-side beam;
means for measuring an adjusted first side lobe gain and an adjusted first side lobe direction of a first side lobe of the serving UE-side beam; and
means for reporting, to the serving network entity, one or more of:
a main lobe gain difference between the adjusted main lobe gain and a prior main lobe gain of the serving UE-side beam prior to execution of the means for adjusting;
a main lobe direction change between the adjusted main lobe direction and a prior main lobe direction of the serving UE-side beam prior to execution of the means for adjusting;
a first side lobe gain difference between the adjusted first side lobe gain and a prior first side lobe gain of the serving UE-side beam prior to execution of the means for adjusting; and
a first side lobe direction change between the adjusted first side lobe gain and a prior first side lobe direction of the serving UE-side beam prior to execution of the means for adjusting.

22. The UE of claim 21, further including:
means for determining the main lobe direction change exceeds a predefined threshold value;
means for identifying a new serving UE-side beam corresponding to the adjusted phase shifting resolution, the adjusted amplitude control, or the adjusted combination thereof resulting from the means for adjusting, wherein a new main lobe direction of the new serving UE-side beam lies within a predefined threshold range of the prior main lobe direction of the serving UE-side beam prior to execution of the means for adjusting; and
means for reporting, to the serving network entity, the new serving UE-side beam.

23. The UE of claim 18, wherein the means for sending the uplink transmissions includes means for sending the uplink transmissions via a sidelink transmission interface to a neighboring UE, the UE further including:
means for receiving from the neighboring UE an indication of dynamic phase shifting resolution or amplitude control adjustment capability; and
means for receiving from the neighboring UE a low battery indicator,
wherein the means for identifying the condition includes means for identifying the condition of the low battery indicator of the neighboring UE with the indication of dynamic phase shifting resolution or amplitude control adjustment capability, and
wherein the means for adjusting includes means for increasing the phase shifting resolution, the amplitude control, or the combination thereof.

24. The UE of claim 18, wherein the means for sending the uplink transmissions includes means for sending the uplink transmissions via a sidelink transmission interface to a neighboring UE, the UE further including:
means for transmitting to the neighboring UE an indication of dynamic phase shifting resolution or amplitude control adjustment capability;
means for identifying a low battery condition at the UE, wherein the means for identifying the condition includes means for identifying the low battery condition at the UE, and
wherein the means for adjusting includes means for decreasing the phase shifting resolution, the amplitude control, or the combination thereof; and
means for transmitting to the neighboring UE a low battery indicator.

25. A non-transitory computer-readable medium associated with a user equipment (UE) having program code recorded thereon, the program code comprising program code executable by a computer for causing the computer to:
obtain one or more system performance parameters from a serving network entity, wherein the one or more system performance parameters includes a minimum effective isotropic radiated power (EIRP) for uplink transmissions;
calculate an estimated EIRP for one or more candidate uplink transmission configurations of the UE;
select an uplink transmission configuration of the one or more candidate uplink transmission configuration in response to the estimated EIRP corresponding to the uplink transmission configuration meeting the minimum EIRP; and
send the uplink transmissions according to the uplink transmission configuration.

26. The non-transitory computer-readable medium of claim 25, further including program code executable by the computer for causing the computer to:
identify a condition to dynamically adjust a phase shifting resolution, an amplitude control, or a combination thereof; and
adjust the phase shifting resolution, the amplitude control, or the combination thereof in response to the condition, wherein the program code executable by the computer for causing the computer to calculate the estimated EIRP and to select the uplink transmission configuration is performed using an adjusted phase shifting resolution, an adjusted amplitude control, or an adjusted combination thereof resulting from execution of the program code executable by the computer for causing the computer to adjust.

27. The non-transitory computer-readable medium of claim 26, further including program code executable by the computer for causing the computer to:
measure an adjusted peak array gain of a serving UE-side beam in response to execution of the program code executable the computer for causing the computer to adjust; and
report, to the serving network entity, a peak array gain difference between the adjusted peak array gain and a prior peak array gain of the serving UE-side beam prior to execution of the program code executable by the computer for causing the computer to adjust.

28. The non-transitory computer-readable medium of claim 26, further including execution, in response to the program code executable by the computer for causing the computer to adjust, of program code executable by the computer for causing the computer to:

measure an adjusted main lobe gain and an adjusted main lobe direction of a main lobe of a serving UE-side beam;

measure an adjusted first side lobe gain and an adjusted first side lobe direction of a first side lobe of the serving UE-side beam; and report, to the serving network entity, one or more of:
- a main lobe gain difference between the adjusted main lobe gain and a prior main lobe gain of the serving UE-side beam prior to execution of the program code executable by the computer for causing the computer to adjust;
- a main lobe direction change between the adjusted main lobe direction and a prior main lobe direction of the serving UE-side beam prior to execution of the program code executable by the computer for causing the computer to adjust;
- a first side lobe gain difference between the adjusted first side lobe gain and a prior first side lobe gain of the serving UE-side beam prior to execution of the program code executable by the computer for causing the computer to adjust; and
- a first side lobe direction change between the adjusted first side lobe gain and a prior first side lobe direction of the serving UE-side beam prior to execution of the program code executable by the computer for causing the computer to adjust.

29. The non-transitory computer-readable medium of claim 26, wherein the program code executable by the computer for causing the computer to send the uplink transmissions includes program code executable by the computer for causing the computer to send the uplink transmissions via a sidelink transmission interface to a neighboring UE, the UE further including program code executable by the computer for causing the computer to:

receive from the neighboring UE an indication of dynamic phase shifting resolution or amplitude control adjustment capability; and receive from the neighboring UE a low battery indicator,
- wherein the program code executable by the computer for causing the computer to identify the condition includes program code executable by the computer for causing the computer to identify the condition of the low battery indicator of the neighboring UE with the indication of dynamic phase shifting resolution or amplitude control adjustment capability, and
- wherein the program code executable by the computer for causing the computer to adjust includes program code executable by the computer for causing the computer to increase the phase shifting resolution, the amplitude control, or the combination thereof.

30. The non-transitory computer-readable medium of claim 26, wherein the program code executable by the computer for causing the computer to send the uplink transmissions includes program code executable by the computer for causing the computer to send the uplink transmissions via a sidelink transmission interface to a neighboring UE, the UE further including program code executable by the computer for causing the computer to:

transmit to the neighboring UE an indication of dynamic phase shifting resolution or amplitude control adjustment capability;

identify a low battery condition at the UE,
- wherein the program code executable by the computer for causing the computer to identify the condition includes program code executable by the computer for causing the computer to identify the low battery condition at the UE, and
- wherein the program code executable by the computer for causing the computer to adjust includes program code executable by the computer for causing the computer to decrease the phase shifting resolution, the amplitude control, or the combination thereof; and transmit to the neighboring UE a low battery indicator.

* * * * *